United States Patent
Holzer et al.

(10) Patent No.: US 10,540,773 B2
(45) Date of Patent: *Jan. 21, 2020

(54) SYSTEM AND METHOD FOR INFINITE SMOOTHING OF IMAGE SEQUENCES

(71) Applicant: Fyusion, Inc., San Francisco, CA (US)

(72) Inventors: Stefan Johannes Josef Holzer, San Mateo, CA (US); Stephen David Miller, San Francisco, CA (US); Radu Bogdan Rusu, San Francisco, CA (US); Yuheng Ren, San Bruno, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,578

(22) Filed: Apr. 15, 2019

(65) Prior Publication Data
US 2019/0244372 A1    Aug. 8, 2019

Related U.S. Application Data

(63) Continuation of application No. 15/425,983, filed on Feb. 6, 2017, now Pat. No. 10,262,426, which is a
(Continued)

(51) Int. Cl.
*G06T 7/33* (2017.01)
*G06K 9/46* (2006.01)
(Continued)

(52) U.S. Cl.
CPC .............. *G06T 7/337* (2017.01); *G06F 3/005* (2013.01); *G06F 3/0304* (2013.01);
(Continued)

(58) Field of Classification Search
None
See application file for complete search history.

(56) References Cited

U.S. PATENT DOCUMENTS

| 5,495,576 A | 2/1996 | Ritchey |
| 5,613,048 A | 3/1997 | Chen et al. |

(Continued)

FOREIGN PATENT DOCUMENTS

| CN | 105849781 A | 8/2016 |
| DE | 112014005165 T5 | 7/2016 |

(Continued)

OTHER PUBLICATIONS

Guofeng Zhang, Wei Hua, Xueying Qin, Yuanlong Shao, Hujun Bao, "Video stabilization based on a 3D perspective camera model", Nov. 2009, Springer, The Visual Computer (2009) 25: 997.*

(Continued)

*Primary Examiner* — Robert Bader
(74) *Attorney, Agent, or Firm* — Kwan & Olynick LLP

(57) ABSTRACT

Various embodiments of the present invention relate generally to systems and processes for interpolating images of an object. According to particular embodiments, a sequence of images is obtained using a camera which captures the sequence of images along a camera translation. Each image contains at least a portion of overlapping subject matter. A plurality of keypoints is identified on a first image of the sequence of images. Each keypoint from the first image are kept track of to a second image. Using a predetermined algorithm, a plurality of transformations are computed using two randomly sampled keypoint correspondences, each of which includes a keypoint on the first image and a corresponding keypoint on the second image. An optimal subset of transformations is determined from the plurality of transformations based on predetermined criteria, and transformation parameters corresponding to the optimal subset of transformations is calculated and stored for on-the-fly interpolation.

20 Claims, 14 Drawing Sheets

Related U.S. Application Data continuation-in-part of application No. 14/530,669, filed on Oct. 31, 2014, now abandoned, and a continuation-in-part of application No. 14/800,638, filed on Jul. 15, 2015, now Pat. No. 9,940,541, and a continuation-in-part of application No. 14/860,983, filed on Sep. 22, 2015.

(51) Int. Cl.

| | | |
|---|---|---|
| *G06T 3/40* | (2006.01) | |
| *G06T 15/20* | (2011.01) | |
| *H04N 5/232* | (2006.01) | |
| *H04N 5/265* | (2006.01) | |
| *G06F 3/00* | (2006.01) | |
| *G06F 3/03* | (2006.01) | |
| *H04N 13/279* | (2018.01) | |
| *H04N 13/282* | (2018.01) | |
| *G06F 16/783* | (2019.01) | |
| *G06F 16/583* | (2019.01) | |
| *G06F 16/532* | (2019.01) | |
| *G06F 16/738* | (2019.01) | |

(52) U.S. Cl.
CPC ........ *G06F 16/532* (2019.01); *G06F 16/5838* (2019.01); *G06F 16/738* (2019.01); *G06F 16/783* (2019.01); *G06K 9/46* (2013.01); *G06T 3/4038* (2013.01); *G06T 15/205* (2013.01); *H04N 5/23238* (2013.01); *H04N 5/265* (2013.01); *H04N 13/279* (2018.05); *H04N 13/282* (2018.05); *G06T 2207/10016* (2013.01)

(56) References Cited

U.S. PATENT DOCUMENTS

| | | | |
|---|---|---|---|
| 5,850,352 A | 12/1998 | Moezzi et al. | |
| 5,926,190 A | 7/1999 | Turkowski et al. | |
| 6,031,564 A | 2/2000 | Ma et al. | |
| 6,080,063 A | 6/2000 | Khosla | |
| 6,252,974 B1 | 6/2001 | Martens et al. | |
| 6,281,903 B1 | 8/2001 | Martin et al. | |
| 6,327,381 B1 | 12/2001 | Rogina et al. | |
| 6,504,569 B1 | 1/2003 | Jasinschi et al. | |
| 6,778,207 B1 | 8/2004 | Lee et al. | |
| 7,167,180 B1 | 1/2007 | Shibolet | |
| 7,593,000 B1 | 9/2009 | Chin | |
| 8,078,004 B2 | 12/2011 | Kang et al. | |
| 8,244,069 B1 | 8/2012 | Bourdev | |
| 8,401,276 B1* | 3/2013 | Choe | G01C 11/06 382/154 |
| 8,504,842 B1 | 8/2013 | Meacham | |
| 8,682,097 B2 | 3/2014 | Steinberg et al. | |
| 8,803,912 B1 | 8/2014 | Fouts | |
| 8,947,452 B1 | 2/2015 | Ballagh et al. | |
| 8,947,455 B2 | 2/2015 | Friesen | |
| 8,963,855 B2 | 2/2015 | Chen et al. | |
| 9,027,117 B2 | 5/2015 | Wilairat | |
| 9,129,179 B1 | 9/2015 | Wong | |
| 9,325,899 B1 | 4/2016 | Chou et al. | |
| 9,367,951 B1 | 6/2016 | Gray et al. | |
| 9,390,250 B2 | 7/2016 | Kim et al. | |
| 9,400,595 B2 | 7/2016 | Li et al. | |
| 9,412,203 B1 | 8/2016 | Garcia, III et al. | |
| 9,734,586 B2 | 8/2017 | Luo et al. | |
| 9,865,033 B1 | 1/2018 | Jafarzadeh et al. | |
| 9,898,742 B2 | 2/2018 | Higgins et al. | |
| 9,910,505 B2 | 3/2018 | Park et al. | |
| 9,940,541 B2 | 4/2018 | Holzer et al. | |
| 10,147,211 B2 | 12/2018 | Holzer et al. | |
| 10,176,592 B2 | 1/2019 | Holzer et al. | |
| 10,222,932 B2 | 3/2019 | Holzer et al. | |
| 10,242,474 B2 | 3/2019 | Holzer et al. | |
| 10,262,426 B2 | 4/2019 | Holzer et al. | |
| 2002/0024517 A1 | 2/2002 | Yamaguchi et al. | |
| 2002/0094125 A1 | 7/2002 | Guo | |
| 2002/0190991 A1 | 12/2002 | Efran et al. | |
| 2003/0086002 A1 | 5/2003 | Cahill et al. | |
| 2004/0104935 A1 | 6/2004 | Williamson et al. | |
| 2004/0141014 A1 | 7/2004 | Kamiwada et al. | |
| 2004/0184013 A1 | 9/2004 | Raskar et al. | |
| 2004/0222987 A1 | 11/2004 | Chang et al. | |
| 2005/0151759 A1 | 7/2005 | Gonzalez-banos et al. | |
| 2005/0219264 A1 | 10/2005 | Shum et al. | |
| 2005/0226502 A1 | 10/2005 | Cohen et al. | |
| 2005/0232467 A1 | 10/2005 | Mohri et al. | |
| 2005/0285874 A1 | 12/2005 | Zitnick, III et al. | |
| 2006/0188147 A1 | 8/2006 | Rai et al. | |
| 2006/0193535 A1 | 8/2006 | Mishima et al. | |
| 2006/0250505 A1 | 11/2006 | Gennetten et al. | |
| 2007/0008312 A1* | 1/2007 | Zhou | G06T 7/80 345/419 |
| 2007/0110338 A1* | 5/2007 | Snavely | G06K 9/00637 382/305 |
| 2007/0159487 A1 | 7/2007 | Felt | |
| 2007/0237420 A1 | 10/2007 | Steedly et al. | |
| 2007/0237422 A1 | 10/2007 | Zhou et al. | |
| 2007/0252804 A1 | 11/2007 | Engel et al. | |
| 2008/0106593 A1 | 5/2008 | Arfvidsson et al. | |
| 2008/0152258 A1 | 6/2008 | Tulkki | |
| 2008/0201734 A1 | 8/2008 | Lyon et al. | |
| 2008/0225132 A1 | 9/2008 | Inaguma | |
| 2008/0246759 A1 | 10/2008 | Summers | |
| 2008/0278569 A1 | 11/2008 | Rotem et al. | |
| 2008/0313014 A1 | 12/2008 | Fell et al. | |
| 2009/0116732 A1 | 5/2009 | Zhou et al. | |
| 2009/0144173 A1 | 6/2009 | Mo et al. | |
| 2009/0160934 A1 | 6/2009 | Hendrickson et al. | |
| 2009/0262074 A1 | 10/2009 | Nasiri et al. | |
| 2009/0263045 A1 | 10/2009 | Szeliski et al. | |
| 2009/0276805 A1 | 11/2009 | Andrews, II et al. | |
| 2009/0303343 A1 | 12/2009 | Drimbarean et al. | |
| 2010/0033553 A1 | 2/2010 | Levy | |
| 2010/0079667 A1* | 4/2010 | Turetken | H04N 7/0137 348/443 |
| 2010/0110069 A1 | 5/2010 | Yuan | |
| 2010/0171691 A1 | 7/2010 | Cook et al. | |
| 2010/0188584 A1 | 7/2010 | Liu et al. | |
| 2010/0215251 A1 | 8/2010 | Klein Gunnewiek et al. | |
| 2010/0225743 A1 | 9/2010 | Florencia et al. | |
| 2010/0259595 A1 | 10/2010 | Trimeche et al. | |
| 2010/0305857 A1 | 12/2010 | Byrne et al. | |
| 2010/0315412 A1 | 12/2010 | Sinha et al. | |
| 2011/0007072 A1 | 1/2011 | Khan et al. | |
| 2011/0040539 A1 | 2/2011 | Szymczyk et al. | |
| 2011/0043604 A1 | 2/2011 | Peleg et al. | |
| 2011/0141227 A1 | 6/2011 | Bigioi et al. | |
| 2011/0142289 A1 | 6/2011 | Barenbrug et al. | |
| 2011/0170789 A1 | 7/2011 | Amon et al. | |
| 2011/0193941 A1 | 8/2011 | Inaba et al. | |
| 2011/0248987 A1 | 10/2011 | Mitchell | |
| 2011/0254835 A1 | 10/2011 | Segal | |
| 2011/0261050 A1 | 10/2011 | Smolic et al. | |
| 2012/0007713 A1 | 1/2012 | Nasiri et al. | |
| 2012/0013711 A1 | 1/2012 | Tamir et al. | |
| 2012/0019557 A1 | 1/2012 | Aronsson et al. | |
| 2012/0028706 A1 | 2/2012 | Raitt et al. | |
| 2012/0041722 A1 | 2/2012 | Quan et al. | |
| 2012/0127172 A1 | 5/2012 | Wu et al. | |
| 2012/0127270 A1 | 5/2012 | Zhang et al. | |
| 2012/0139918 A1 | 6/2012 | Michail et al. | |
| 2012/0147224 A1 | 6/2012 | Takayama | |
| 2012/0148162 A1 | 6/2012 | Zhang et al. | |
| 2012/0162223 A1 | 6/2012 | Hirai et al. | |
| 2012/0167146 A1 | 6/2012 | Incorvia | |
| 2012/0212579 A1 | 8/2012 | Frojdh et al. | |
| 2012/0257065 A1 | 10/2012 | Velarde et al. | |
| 2012/0301044 A1 | 11/2012 | Nakada | |
| 2012/0314899 A1 | 12/2012 | Cohen et al. | |
| 2013/0002649 A1 | 1/2013 | Wu et al. | |
| 2013/0016897 A1 | 1/2013 | Cho et al. | |
| 2013/0018881 A1 | 1/2013 | Bhatt | |
| 2013/0057644 A1 | 3/2013 | Stefanoski et al. | |

(56) References Cited

U.S. PATENT DOCUMENTS

| | | |
|---|---|---|
| 2013/0063549 A1 | 3/2013 | Schnyder et al. |
| 2013/0076619 A1 | 3/2013 | Carr et al. |
| 2013/0113830 A1 | 5/2013 | Suzuki |
| 2013/0154926 A1 | 6/2013 | Kim et al. |
| 2013/0155180 A1 | 6/2013 | Wantland et al. |
| 2013/0162634 A1 | 6/2013 | Baik |
| 2013/0176392 A1 | 7/2013 | Carr et al. |
| 2013/0195350 A1 | 8/2013 | Tanaka et al. |
| 2013/0204411 A1 | 8/2013 | Clark et al. |
| 2013/0219357 A1 | 8/2013 | Reitan |
| 2013/0250045 A1 | 9/2013 | Ki et al. |
| 2013/0271566 A1 | 10/2013 | Chen et al. |
| 2013/0278596 A1 | 10/2013 | Wu et al. |
| 2013/0314442 A1 | 11/2013 | Langlotz et al. |
| 2014/0009462 A1 | 1/2014 | Mcnamer et al. |
| 2014/0037198 A1 | 2/2014 | Larlus-larrondo et al. |
| 2014/0049607 A1 | 2/2014 | Amon et al. |
| 2014/0059674 A1 | 2/2014 | Sun et al. |
| 2014/0063005 A1 | 3/2014 | Ahn et al. |
| 2014/0078136 A1 | 3/2014 | Sohn et al. |
| 2014/0087877 A1 | 3/2014 | Krishnan |
| 2014/0118494 A1 | 5/2014 | Wu et al. |
| 2014/0153832 A1 | 6/2014 | Kwatra et al. |
| 2014/0192155 A1 | 7/2014 | Choi et al. |
| 2014/0198184 A1 | 7/2014 | Stein et al. |
| 2014/0211989 A1 | 7/2014 | Ding et al. |
| 2014/0253436 A1 | 9/2014 | Petersen |
| 2014/0253746 A1 | 9/2014 | Voss et al. |
| 2014/0267616 A1 | 9/2014 | Krig |
| 2014/0286566 A1 | 9/2014 | Rhoads |
| 2014/0293004 A1 | 10/2014 | Tsubaki |
| 2014/0293028 A1 | 10/2014 | Nguyen et al. |
| 2014/0307045 A1 | 10/2014 | Richardt et al. |
| 2014/0340404 A1 | 11/2014 | Wang et al. |
| 2015/0010218 A1 | 1/2015 | Bayer |
| 2015/0078449 A1 | 3/2015 | Diggins et al. |
| 2015/0193963 A1 | 3/2015 | Diggins |
| 2015/0294492 A1 | 3/2015 | Diggins |
| 2015/0130799 A1 | 5/2015 | Holzer et al. |
| 2015/0130800 A1 | 5/2015 | Holzer et al. |
| 2015/0130894 A1 | 5/2015 | Holzer et al. |
| 2015/0134651 A1 | 5/2015 | Holzer et al. |
| 2015/0138190 A1 | 5/2015 | Holzer et al. |
| 2015/0198443 A1 | 7/2015 | Yi et al. |
| 2015/0227816 A1 | 8/2015 | Du et al. |
| 2015/0235408 A1 | 8/2015 | Gross et al. |
| 2015/0269772 A1 | 9/2015 | Ha et al. |
| 2015/0319424 A1 | 11/2015 | Haimovitch-yogev et al. |
| 2015/0339846 A1 | 11/2015 | Holzer et al. |
| 2015/0371440 A1 | 12/2015 | Pirchheim et al. |
| 2015/0379763 A1 | 12/2015 | Liktor et al. |
| 2016/0034459 A1 | 2/2016 | Larsen et al. |
| 2016/0050368 A1 | 2/2016 | Seo et al. |
| 2016/0086381 A1 | 3/2016 | Jung et al. |
| 2016/0140125 A1 | 5/2016 | Goyal et al. |
| 2016/0191895 A1 | 6/2016 | Yun |
| 2016/0350930 A1 | 12/2016 | Lin et al. |
| 2016/0350975 A1 | 12/2016 | Nakagawa |
| 2016/0353089 A1 | 12/2016 | Gallup et al. |
| 2016/0358337 A1 | 12/2016 | Dai et al. |
| 2017/0018054 A1 | 1/2017 | Holzer et al. |
| 2017/0018055 A1 | 1/2017 | Holzer et al. |
| 2017/0018056 A1 | 1/2017 | Holzer et al. |
| 2017/0084001 A1 | 3/2017 | Holzer et al. |
| 2017/0126988 A1 | 5/2017 | Holzer et al. |
| 2017/0140236 A1 | 5/2017 | Price et al. |
| 2017/0148179 A1 | 5/2017 | Holzer et al. |
| 2017/0148186 A1 | 5/2017 | Holzer et al. |
| 2017/0148199 A1 | 5/2017 | Holzer et al. |
| 2017/0148222 A1 | 5/2017 | Holzer et al. |
| 2017/0148223 A1 | 5/2017 | Holzer et al. |
| 2017/0231550 A1 | 8/2017 | Do et al. |
| 2017/0277363 A1 | 9/2017 | Holzer et al. |
| 2017/0287137 A1 | 10/2017 | Lin et al. |
| 2017/0330319 A1 | 11/2017 | Xu et al. |
| 2017/0344223 A1 | 11/2017 | Holzer et al. |
| 2017/0344808 A1 | 11/2017 | El-Khamy et al. |
| 2017/0359570 A1 | 12/2017 | Holzer et al. |
| 2018/0012330 A1 | 1/2018 | Holzer et al. |
| 2018/0046356 A1 | 2/2018 | Holzer et al. |
| 2018/0046357 A1 | 2/2018 | Holzer et al. |
| 2018/0211131 A1 | 7/2018 | Holzer et al. |
| 2018/0218235 A1 | 8/2018 | Holzer et al. |
| 2018/0218236 A1 | 8/2018 | Holzer et al. |
| 2018/0255290 A1 | 9/2018 | Holzer et al. |
| 2019/0019056 A1 | 1/2019 | Pierce et al. |
| 2019/0080499 A1 | 3/2019 | Holzer et al. |

FOREIGN PATENT DOCUMENTS

| | | |
|---|---|---|
| GB | 2534821 A | 8/2016 |
| WO | 2015073570 A2 | 5/2015 |
| WO | 2018035500 A1 | 2/2018 |
| WO | 2018052665 A1 | 3/2018 |

OTHER PUBLICATIONS

Martin A. Fischler, Robert C. Bolles, "Random Sample Consensus: A Paradigm for Model Fitting with Applications to Image Analysis and Automated Cartography", Jun. 1981, ACM, Communications of the ACM, vol. 24, No. 6, pp. 381-395.*

Simon Gibson, Jon Cook, Toby Howard, Roger Hubbold, Dan Oram, "Accurate Camera Calibration for Off-line, Video-Based Augmented Reality", Oct. 1, 2002, IEEE, Proceedings of the International Symposium on Mixed and Augmented Reality (ISMAR'02).*

Krystian Mikolajczyk, Cordelia Schmid, "A Performance Evaluation of Local Descriptors", Oct. 2005, IEEE, IEEE Transactions on Pattern Analysis and Machine Intelligence, vol. 27, No. 10, pp. 1615-1630.*

Christian Weigel, Leif Lennart Kreibich, "Advanced 3D Video Object Synthesis Based on Trilinear Tensors", Jul. 1, 2006, IEEE, 2006 IEEE Tenth International Symposium on Consumer Electronics, 2006. ISCE '06.*

VideoHelp Forum, "Extract all frames from video files", Oct. 6, 2010, website, retrieved from https://forum.videohelp.com/threads/326738-Extract-all-frames-from-video-files on Jan. 3, 2018.*

Andrea Fusiello, "Specifying Virtual Cameras in Uncalibrated View Synthesis", May 2007, IEEE, IEEE Transactions on Circuits and Systems for Video Technology, vol. 17, No. 5.*

Zhengyou Zhang, Rachid Deriche, Olivier Faugeras, Quang-Tuan Luong, "A robust technique for matching two uncalibrated images through the recovery of the unknown epipolar geometry", 1995, Elsevier, Artificial Intelligence 78 (1995) 87-119.*

Hong-Chang Shin, Yong-Jin Kim, Hanhoon Park, and Jong-Il Park, "Fast View Synthesis using GPU for 3D Display", Dec. 22, 2008, IEEE, IEEE Transactions on Consumer Electronics, vol. 54, No. 4, pp. 2068-2076.*

"U.S. Appl. No. 14/800,638, Non Final Office Action dated Jul. 29, 2016", 11 pages.

"U.S. Appl. No. 14/530,671, Non Final Office Action dated Jan. 3, 2017", 32 pages.

"U.S. Appl. No. 14/539,889, Non Final Office Action dated Oct. 6, 2016", 14 pages.

"U.S. Appl. No. 14/800,638, Examiner Interview Summary dated May 9, 2017", 2 pages.

"U.S. Appl. No. 14/800,638, Examiner Interview Summary dated Nov. 7, 2016", 3 pages.

"U.S. Appl. No. 14/800,638, Final Office Action dated Jan. 20, 2017", 12 pages.

"U.S. Appl. No. 14/800,638, Non Final Office Action dated Jun. 15, 2017", 12 pgs.

"U.S. Appl. No. 14/800,638, Notice of Allowance dated Dec. 13, 2017", 9 pages.

"U.S. Appl. No. 14/800,640, Final Office Action dated Oct. 16, 2017", 15 pages.

"U.S. Appl. No. 14/800,640, Non Final Office Action dated Jun. 8, 2017", 14 pgs.

(56) References Cited

OTHER PUBLICATIONS

"U.S. Appl. No. 14/800,640, Non Final Office Action dated Jul. 17, 2018", 16 pages.
"U.S. Appl. No. 14/800,640, Notice of Allowance dated Nov. 21, 2018", 7 pgs.
"U.S. Appl. No. 14/800,640, Restriction Requirement dated Mar. 3, 2017", 5 pages.
"U.S. Appl. No. 14/800,640, Final Office Action dated Oct. 17, 2017", 18 pages.
"U.S. Appl. No. 14/800,640, Non Final Office Action dated May 18, 2017", 17 pages.
"U.S. Appl. No. 14/800,642, Notice of Allowance dated Aug. 6, 2018", 12 pages.
"U.S. Appl. No. 14/819,473, Examiner Interview Summary dated Jul. 11, 2016", 3 pages.
"U.S. Appl. No. 14/819,473, Examiner Interview Summary dated Aug. 17, 2016", 3 pages.
"U.S. Appl. No. 14/819,473, Examiner Interview Summary dated Oct. 14, 2016", 3 pages.
"U.S. Appl. No. 14/819,473, Final Office Action dated Apr. 28, 2016", 45 pages.
"U.S. Appl. No. 14/819,473, Non Final Office Action dated Sep. 1, 2016", 36 pages.
"U.S. Appl. No. 14/819,473, Non Final Office Action dated Oct. 8, 2015", 44 pgs.
"U.S. Appl. No. 15/425,983, Final Office Action dated Jun. 26, 2018", 29 pages.
"International Application Serial No. PCT/US2016/042355, Search Report and Written Opinion dated Oct. 19, 2016", 9 pages.
"Int'l Application Serial No. PCT/US17/47684, Int'l Search Report and Written Opinion dated Oct. 27, 2017", 8 pgs.
"Int'l Application Serial No. PCT/US17/47859, Int'l Search Report and Written Opinion dated Nov. 2, 2017", 8 pages.
"Int'l Application Serial No. PCT/US2014/065282, Search Report & Written Opinion dated Feb. 23, 2015", 9 pgs.
"United Kingdom Application Serial No. 1609577.0, Office Action dated Jun. 15, 166", 1 pg.
Ballan, Luca et al., "Unstructured Video-Based Rendering: Interactive Exploration of Casually Captured Videos", ACM, ACM Transactions on Graphics (TOG)—Proceedings of ACM SIGGRAPH 2010, vol. 29, Issue 4, Article No. 87, Jul. 30, 2010.
Cao, Xun et al., "Semi-Automatic 2D-to-3D Conversion Using Disparity Propagation", IEEE, IEEE Transactions on Broadcasting, vol. 57, Issue 2, Apr. 19, 2011, pp. 491-499.
Chan, Shing-Chow et al., "An Object-Based Approach to Image/Video-Based Synthesis and Processing for 3-D and Multiview Televisions", IEEE, IEEE Transactions on Circuits and Systems for Video Technology, vol. 19, Issue 6, Mar. 16, 2009, pp. 821-831.
Clare, Adam , "Reality is a Game; What is Skybox?", retrieved from the Internet <http://www.realityisagame.com/archives/1776/what-is-a-skybox/>, 5.
Figueroa, Nadia et al., "From Sense to Print: Towards Automatic 3D Printing from 3D Sensing Devices", IEEE, 2013 IEEE International Conference on Systems, Man, and Cybernetics (SMC, Oct. 13, 2013.
Fusiello, Andrea et al., "View Synthesis from Uncalibrated Images Using Parallax", Proceedings of the 12th International Conference on Image Analysis and Processing, 2003, pp. 146-151.
Golovinsky, Aleksey et al., "Shape-based Recognition of 3D Point Clouds in Urban Environment", IEEE, IEEE 12th International Conference on Computer Vision (ICCV), 2009, 2154-2161.
Gurdan, Tobias et al., "Spatial and Temporal Interpolation of Multi-View Image Sequences", Department of Computer Science, Technische Universitat Munchen Ascending Technologies GmbH, Krailing, Germany, Section 2.3, Image Warping and Blending; Retrieved from the Internet <https://vision.in.tum.de/_media/spezial/bib/gurdan-et-al-gcpr-2014.pdf>, 12.
Keller, Maik et al., "Real-Time 3D Reconstruction in Dynamic Scenes Using Point-Based Fusion", IEEE, 2013 International Conference on 3DTV, Jul. 1, 2013.
Kottamasu, V. L. P. , "User Interaction of One-Dimensional Panoramic Images for iPod Touch", Thesis, Linkoping University Electronic Press, LIU-IDA-LITH-EX-A—12/071—SE, Dec. 4, 2012.
Mian, Ajmal S. et al., "Three-Dimensional Model-Based Object Recognition and Segmentation in Clutterd Scenes", IEEE Transactions on Pattern Analysis and Machine Intelligence, col. 28, No. 10, Oct. 2006, 1584-1601.
Saito, Hideo et al., "View Interpolation of Multiple Cameras Based on Projective Geometry", Department of Information and Computer Science, Keio University and Presto, Japan Science and Technology Corporation (JST), retrieved from the Internet <http://citeseerx.ist.psu.edu/viewdoc/download?doi=10.1.1.6.5162&rep=rep1&type=pdf>, 6.
Schiller, Ingo et al., "Datastructure for Capturing Dynamic Scenes with a Time-of-Flight Camera", Springer-Verlad, Dyna3D 2009, LNCS 5742, 2009, 42-57.
Seitz, Steven M. , "Image-Based Transformation of Viewpoint and Scene Appearance", A Dissertation submitted in partial fulfillment of the requirements for the Degree of Doctor of Philosophy at the University of Wisconsin; retrieved from the Internet <http://homes.cs.washington.edu/~seitz/papers/thesis.pdf>, 1997, 111.
Shade, Jonathan et al., "Layered Depth Images", Proceedings of the 25th Annual Conference on Computer Graphics and Interactive Techniques, ACM, SIGGRAPH, Jul. 24, 1998, pp. 231-242.
Shin, Hong-Chang et al., "Fast View Synthesis using GPU for 3D Display", IEEE Transactions on Consumer Electronics, vol. 54, No. 4, Dec. 2008, pp. 2068-2076.
Snavely, Noah et al., "Photo Tourism: Exploring Phot Collections in 3D", ACM, ACM Transactions on Graphics (TOG)—Proceeding of ACM SIGGRAPH 2006, vol. 25, Issue 3, Jul. 2006, 835-846.
Steder, Bastian et al., "Robust On-line Model-based Object Detection from Range Images", International Conference on Intelligent Robots and Systems, pp. 4739-4744, Oct. 15, 2009, 6 pages.
Thyssen, Anthony , "ImageMagick v6 Examples—Color Basics and Channels", Website http://www.imagemagick.org/Usage/color_basics/, Retrieved Dec. 23, 2016, Mar. 9, 2011.

\* cited by examiner

SYSTEM AND METHOD FOR INFINITE SMOOTHING OF IMAGE SEQUENCES

CROSS-REFERENCE TO RELATED APPLICATIONS

This application is a continuation of U.S. patent application Ser. No. 15/425,983 by Holzer et al., filed on Feb. 6, 2017 titled SYSTEM AND METHOD FOR INFINITE SMOOTHING OF IMAGE SEQUENCES, which is a continuation-in-part of U.S. patent application Ser. No. 14/530,669 by Holzer et al., filed on Oct. 31, 2014, titled ANALYSIS AND MANIPULATION OF IMAGES AND VIDEO FOR GENERATION OF SURROUND VIEWS; and a continuation-in-part of U.S. patent application Ser. No. 14/800,638 by Holzer et al., filed on Jul. 15, 2015, titled ARTIFICIALLY RENDERING IMAGES USING INTERPOLATION OF TRACKED CONTROL POINTS, now U.S. Pat. No. 9,940,541, issued on Apr. 10, 2019; and a continuation-in-part of U.S. patent application Ser. No. 14/860,983 by Holzer et al., filed on Sep. 22, 2015, titled ARTIFICIALLY RENDERING IMAGES USING VIEWPOINT INTERPOLATION AND EXTRAPOLATION. The above referenced applications are incorporated by reference herein in their entirety and for all purposes.

TECHNICAL FIELD

The present disclosure relates generally to the capture and presentation of image sequences, and more specifically to artificially rendering images between captured image frames.

BACKGROUND

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity.

Producing combined images, such as a panorama, or a three-dimensional (3D) image or model requires combining data from multiple images and can require interpolation or extrapolation of data. Most previously existing methods of interpolation or extrapolation require a significant amount of data in addition to the available image data. For those approaches, the additional data needs to describe the scene structure in a dense way, such as provided by a dense depth map (where for every pixel a depth value is stored) or an optical flow map (which stores for every pixel the motion vector between the available images). This limits the efficiency of these methods in processing speed as well as transfer rates when sending it over a network. Accordingly, improved mechanisms for interpolation and extrapolation are desirable.

SUMMARY

Provided are various mechanisms and processes relating to infinite smoothing of image sequences. In one aspect, which may include at least a portion of the subject matter of any of the preceding and/or following examples and aspects, a method for interpolating images of an object is provided. The method comprises obtaining a sequence of images using a camera. The sequence of images may be captured along a camera translation. Each image in the sequence of images may contain at least a portion of overlapping subject matter which includes an object. The method further comprises identifying a plurality of keypoints on a first image of the sequence of images and keeping track of each keypoint from the first image to a second image. Identifying a plurality of keypoints may include using Harris-style keypoint detection. Keeping track of each keypoint may include using KLT-stlye keypoint tracking.

The method further comprises computing, using a predetermined algorithm, a plurality of transformations. Each transformation may be computed using two randomly sampled keypoint correspondences. Each keypoint correspondence includes a keypoint on the first image and a corresponding keypoint on the second image. Transformations may be computed for a predetermined number of keypoint correspondences. Computing a transformation may include using similarity 2D parameters.

The method further comprises determining an optimal subset of transformations from the plurality of transformations based on predetermined criteria. Determining the optimal subset of transformations may include, for a particular transformation, determining a number of inlier keypoints and calculating an image intensity difference value between a transformed image and the second image. A random sample consensus (RANSAC) algorithm is implemented to compute the plurality of transformations and determine the optimal subset of transformations.

The method further comprises calculating transformation parameters corresponding to the optimal subset of transformations, and storing the transformation parameters for on-the-fly interpolation. The method may further comprise applying the transformation parameters during runtime based on a user selection. A transformation in the subset of transformations is selected for each pixel during on-the-fly interpolation. The user selection may correspond to a projected physical location of the camera along a calculated camera translation.

Other implementations of this disclosure include corresponding devices, systems, and computer programs, configured to perform the actions of the described method. For instance, a non-transitory computer readable medium is provided comprising one or more programs configured for execution by a computer system. In some embodiments, the one or more programs include instructions for performing the actions of described methods and systems. These other implementations may each optionally include one or more of the following features.

In another aspect, which may include at least a portion of the subject matter of any of the preceding and/or following examples and aspects, a system for interpolating images of an object comprises a camera for obtaining a sequence of images along a camera translation. Each image in the sequence of images contains at least a portion of overlapping subject matter, which includes the object. The system further comprises a processor and memory storing one or more programs configured for execution by the processor. The one or more programs comprise instructions for performing the actions of described methods and systems.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION

Figure 1:
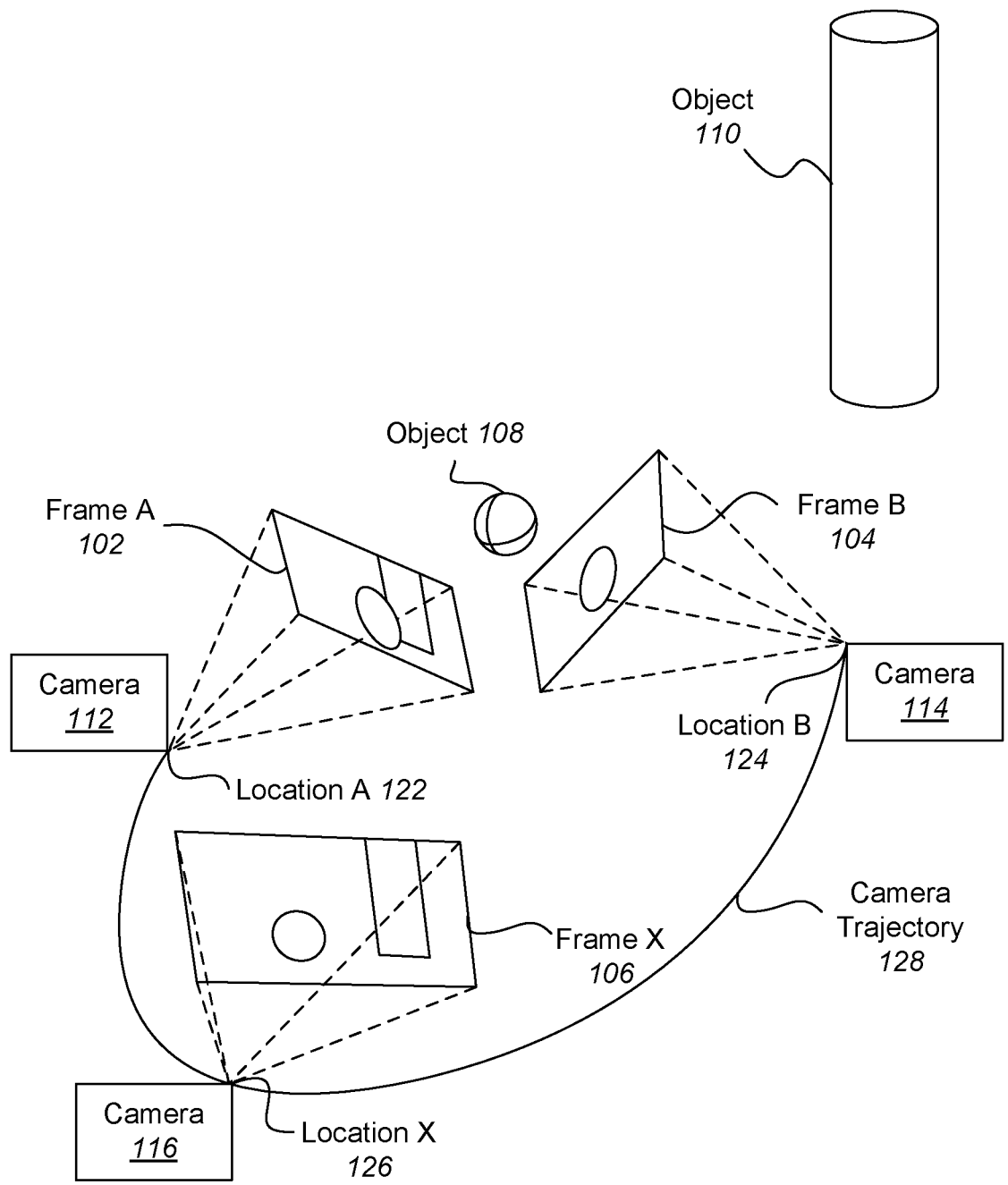
FIG. 1 illustrates an example of a configuration where an artificially rendered image is generated for a chosen viewpoint on a trajectory between two frames.

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

Various systems and methods for analyzing the spatial relationship between multiple images and video together with location information data, for the purpose of creating a single representation, a surround view, which eliminates redundancy in the data, and presents a user with an interactive and immersive active viewing experience, is described in U.S. patent application Ser. No. 14/530,669 by Holzer et al., filed on Oct. 31, 2014, titled ANALYSIS AND MANIPULATION OF IMAGES AND VIDEO FOR GENERATION OF SURROUND VIEWS, which is incorporated by reference herein in its entirety and for all purposes. According to various embodiments described therein, a surround view provides a user with the ability to control the viewpoint of the visual information displayed on a screen.

Overview

According to various embodiments, a surround view is a multi-view interactive digital media representation. The data used to generate a surround view can come from a variety of sources. In particular, data such as, but not limited to, two-dimensional (2D) images can be used to generate a surround view. These 2D images can include color image data streams such as multiple image sequences, video data, etc., or multiple images in any of various formats for images, depending on the application. Another source of data that can be used to generate a surround view includes location information. This location information can be obtained from sources such as accelerometers, gyroscopes, magnetometers, GPS, WiFi, IMU-like systems (Inertial Measurement Unit systems), and the like. Yet another source of data that can be used to generate a surround view can include depth images. These depth images can include depth, 3D, or disparity image data streams, and the like, and can be captured by devices such as, but not limited to, stereo cameras, time-of-flight cameras, three-dimensional cameras, and the like.

In some embodiments, the data can then be fused together. For example, a surround view can be generated by a combination of data that includes both 2D images and location information, without any depth images provided. In other embodiments, depth images and location information can be used together. In various embodiments, depth images may include stereoscopic pairs of images simultaneously presented to the user to provide depth perception of an object of interest and/or other portions of the image. Such stereoscopic pairs of image frames may be created by systems and methods described in the U.S. patent application Ser. No. 15/408,211 titled GENERATING STEREOSCOPIC PAIRS OF IMAGES FROM A SINGLE LENS CAMERA by Holzer et al., filed on Jan. 17, 2016, which application is incorporated by reference herein in its entirety and for all purposes. Various combinations of image data can be used with location information, depending on the application and available data.

In present example embodiments, the data that has been fused together may then used for content modeling and context modeling. According to various examples, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. In various embodiments, the models provided by content modeling and context modeling can be generated by combining the image and location information data.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target can be chosen. It should be noted, however, that a surround view can be generated without a user specified target in some applications.

In present example embodiments, one or more enhancement algorithms can be applied. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

According to various example embodiments, view interpolation can be used to improve the viewing experience. In particular, to avoid sudden "jumps" between stabilized frames, synthetic, intermediate views can be rendered on the fly. According to various embodiments, only a limited amount of image frames are stored for each surround view for storage efficiency. In some examples, the selection of these frames is based on the motion of the camera rather than on time. For instance, a new frame may be sampled only if the camera moved sufficiently with respect to the previously sampled frame. Consequently, in order to provide a smooth viewing experience for a user interacting with a surround view, artificially rendered frames must be generated. These artificially rendered frames serve to close the gap between two sampled frames that would otherwise appear to have a "jump" between them.

Accordingly, by generating these artificially rendered frames, smooth navigation within the surround view becomes possible. This can be informed by content-weighted keypoint tracking and IMU information, as well as by denser pixel-to-pixel matches. If depth information is available, fewer artifacts resulting from mismatched pixels may occur, thereby simplifying the process. As described above, view interpolation can be applied during capture and/or acquisition of a surround view in some embodiments. In other embodiments, view interpolation can be applied during surround view generation.

In the present embodiment, a surround view is generated after any enhancement algorithms are applied. The surround view can provide a multi-view interactive digital media representation. In various examples, the surround view can include a three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used to enhance various fields such as e-commerce, visual search, 3D printing, file sharing, user interaction, and entertainment.

In some embodiments, the surround view model is not an actual three-dimensional model that is rendered, but a three-dimensional view experienced as a three-dimensional model by the user. For example, the surround view provides a three-dimensional view of the content without rendering and/or storing an actual three-dimensional model. In other words, there is no polygon generation or texture mapping over a three-dimensional mesh and/or polygon model. However, the user still perceives the content and/or context as an actual three-dimensional model. The three-dimensional effect provided by the surround view is generated simply through stitching of actual two-dimensional images and/or portions thereof. As used herein, the term "three-dimensional model" is used interchangeably with this type of three-dimensional view.

Various embodiments described below include methods of viewpoint interpolation and extrapolation that can be used to generate any number of artificially rendered frames. In some embodiments, parameters for interpolation may be calculated and stored to be used for on-the-fly interpolation during runtime. An image may be artificially rendered for any number of camera locations based on user selection during runtime. This allows for further storage efficiency because an artificial image may be generated during runtime, instead of storing all images corresponding to all possible camera locations. In various examples, interpolation between frames is performed along a path between the frames. In some instances, this path can follow a non-linear trajectory. In addition, various described extrapolation methods allow the artificially rendered frame to represent a view from a location that is not on the trajectory of the recording camera or in between two sampled frames. By providing interpolation and extrapolation methods for paths between or beyond the originally provided frames, various artificially rendered views can be provided for a surround view.

EXAMPLE EMBODIMENTS

With reference to FIG. 1, shown is one example of multiple camera frames that can be fused together into a three-dimensional (3D) model to create an immersive experience. According to various embodiments, multiple images can be captured from various viewpoints and fused together to provide a surround view. In the present example embodiment, three cameras 112, 114, and 116 are positioned at location A 122, location B 124, and location X 126, respectively, in proximity to an object of interest 108. Scenery can surround the object of interest 108 such as object 110. Frame A 102, frame B 104, and frame X 106 from their respective cameras 112, 114, and 116 include overlapping subject matter. Specifically, each frame 102, 104, and 106 includes the object of interest 108 and varying degrees of visibility of the scenery surrounding the object 110. For instance, frame A 102 includes a view of the object of interest 108 in front of the cylinder that is part of the scenery surrounding the object 110. View 106 shows the object of interest 108 to one side of the cylinder, and view 104 shows the object of interest without any view of the cylinder.

In the present example embodiment, the various frames, frame A 102, frame B 104, and frame X 116, along with their associated locations, location A 122, location B 124, and location X 126, respectively, provide a rich source of information about object of interest 108 and the surrounding context that can be used to produce a surround view. For instance, when analyzed together, the various frames 102, 104, and 126 provide information about different sides of the object of interest and the relationship between the object of interest and the scenery. According to various embodiments, this information can be used to parse out the object of interest 108 into content and the scenery as the context. Furthermore, as also described above, various enhancement algorithms can be applied to images produced by these viewpoints to create an immersive, interactive experience when viewing a surround view.

In some embodiments, Frame X 106 may be an artificially rendered image that is generated for a viewpoint at Location X 126 on a trajectory between Location A 122 and Location B 124. In such example, a single transform for viewpoint interpolation is used along the trajectory between two frames, Frame A 102 and Frame B 104. As previously described, Frame A 102 represents an image captured of objects 108 and 110 by a camera 112 located at Location A 122. Frame B 104 represents an image captured of object 108 by a camera 114 located at Location B 124. In the present example, the transformation (T_AB) is estimated between the two frames, where T_AB maps a pixel from frame A to frame B. This transformation is performed using methods such as homography, affine, similarity, translation, rotation, or scale.

In the example above, an artificially rendered image at Location X 126, which can also be denoted as a viewpoint position at x\in [0, 1] on the trajectory between frame A and B, where frame A is located at 0 and frame B at 1, is then generated by interpolating the transformation, gathering image information from Frames A and B, and combining the image information. In the present example, the transformation is interpolated (T_AX and T_XB). One way to interpolate this transformation is to parameterize the transformation T_AB and linearly interpolate those parameters. However, this interpolation is not limited to linear interpolations and other methods can be used within the scope of this disclosure. Next, image information is gathered from both Frames A and B by transferring image information from Frame A 102 to Frame X 106 based on T_AX and by transferring image information from Frame B 104 to Frame X 106 based on T_XB. Finally, the image information gathered from both Frames A and B is combined to generate an artificially rendered image at Location X 126. Various methods and systems for interpolation to render artificial frames are further described herein.

Figure 2:
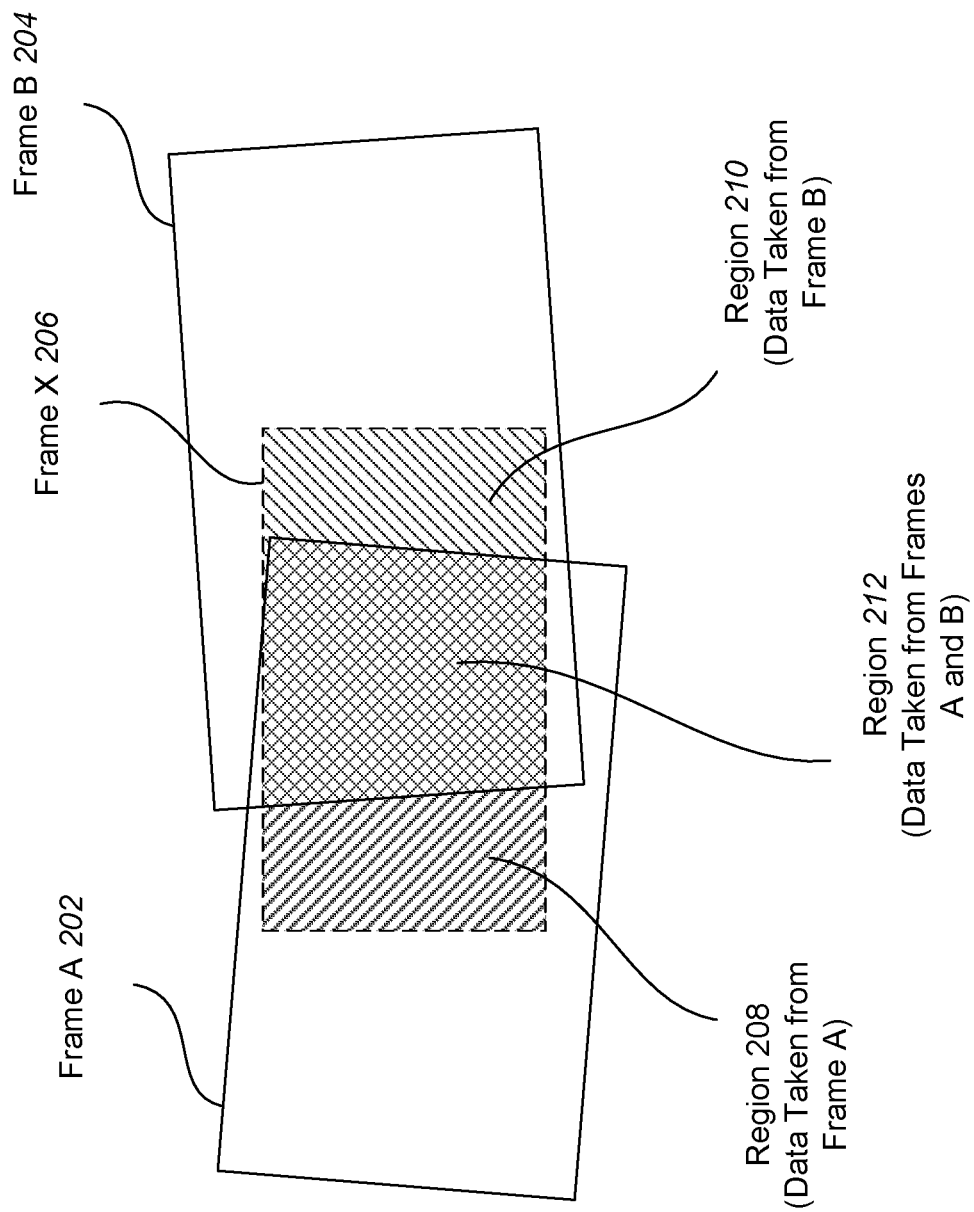
FIG. 2 illustrates an example of combining image information gathered from two frames to artificially render an image for another frame using weighted image information.

In the present example, combining the image information gathered from both Frames A and B can be done in various ways. With reference to FIG. 2, shown is one example of a way to combine image information gathered from both Frames A and B to artificially render an image in Frame X using weighted image information. As shown, image information is taken from Frame A 202 and Frame B 204 to generate an image in Frame X 206. Image information in Region 208 of Frame X 206 is taken from Frame A. Image information in Region 210 of Frame X 206 is taken from Frame B. Image information in Region 212 of Frame X 206 includes information from both Frame A 202 and Frame B 204. In order to account for the overlap in information, the image information is weighted. Specifically, the information is combined using the image information from Frame A 202 using 1-x and the image information from Frame B 204 using x.

Figure 3:
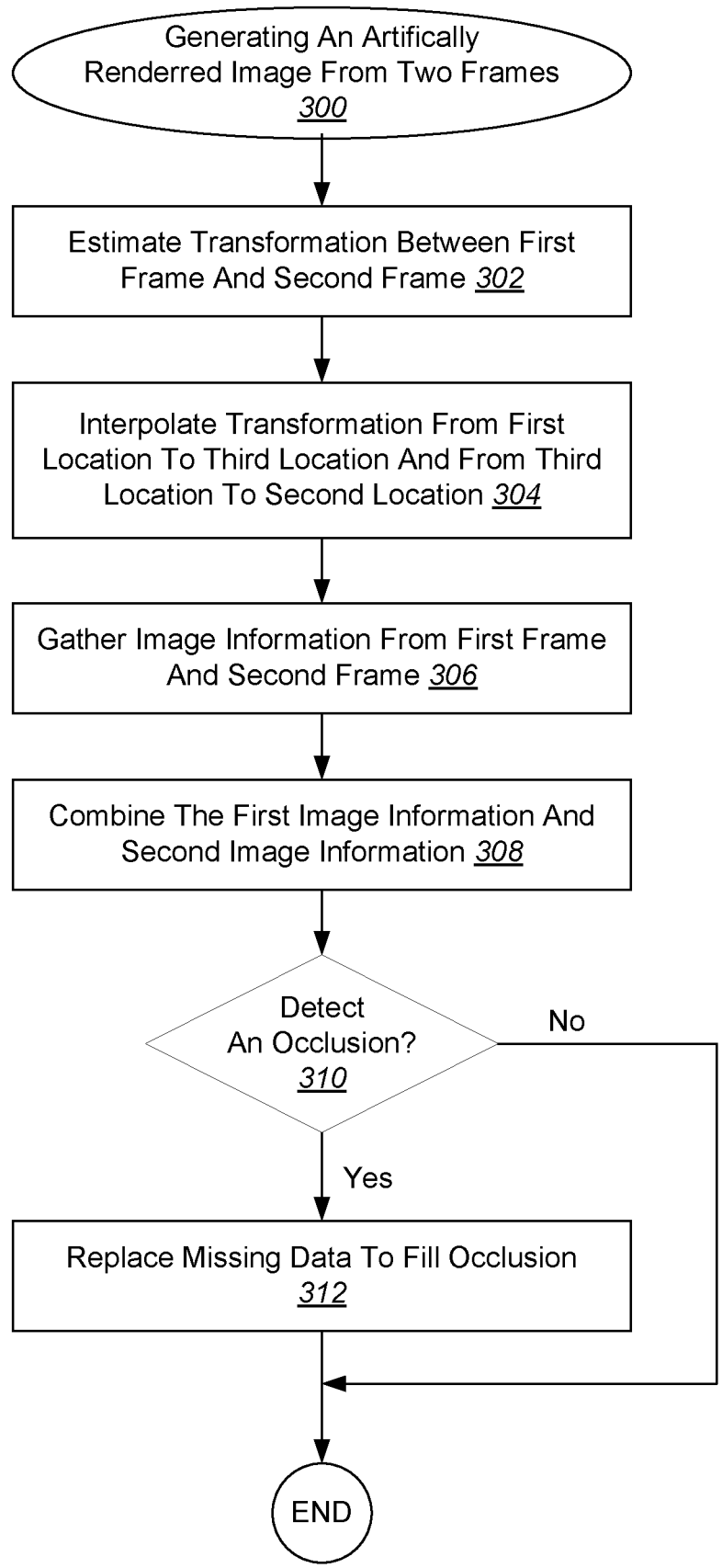
FIG. 3 illustrates an example of a process for generating an artificially rendered image from two frames.

With reference to FIG. 3, shown is an example of a process for generating an artificially rendered image from two frames 300. In this example, a transformation is estimated between a first frame and a second frame at 302. The transformation is estimated using methods such as homography, affine, similarity, translation, rotation, and/or scale. As described above with regard to FIG. 1, the first frame includes a first image captured from a first location (Location A 122) and the second frame includes a second image captured from a second location (Location B 124). In some examples, the first image and second image are associated with the same layer. Next, an artificially rendered image is rendered corresponding to a third location. This third location is positioned on a trajectory between the first location and the second location, as shown as Location X 126 in FIG. 1.

The artificially rendered image is generated in a number of steps. First, a transformation is interpolated from the first location to the third location and from the third location to the second location at 304. In some instances, interpolating the transformation includes parameterizing the transformation from the first location to the third location and from the third location to the second location. Furthermore, in some examples, the parameterized transformation is then linearly interpolated. Parameterizing a transformation is further described below with reference to FIGS. 9 and 10A-10C.

Next, image information is gathered from the first frame and the second frame at 306 by transferring first image information from the first frame to the third frame based on the interpolated transformation and second image information from the second frame to the third frame based on the interpolated transformation. Finally, the first image information and the second image information is combined to yield the artificially rendered image. In some examples, combining the first image information and the second image information includes weighting the first image information from the first frame and the second image information from the second frame.

According to various embodiments, the process can end with combining the first image information and second image information at 308. However, according to the present example, the process shown continues with determining whether an occlusion is present in the artificially rendered image at 310. Such an occlusion is created by a change in layer placement between the first frame and second frame. Specifically, the first image and second image may include foregrounds and backgrounds that include one or more layers, each layer corresponding to a region of image pixels that share a similar motion, as described in more detail below with regard to FIG. 4. These layers can move relative to each other. In some cases, the layers may move in a manner causing an occlusion in a combined image. If an occlusion is detected, then the missing data is replaced to fill the first occlusion at 312. In some instances, the missing data is obtained by interpolation or extrapolation. In other instances, the missing data is obtained from the first frame or the second frame. In yet other instances, the missing data is obtained from another frame (separate from the first and second frame) that includes image information corresponding to the missing data. In another example, the missing data is obtained by extrapolating from surrounding image data. This surrounding image data includes information from frames located near the first location and second location.

Figure 4:
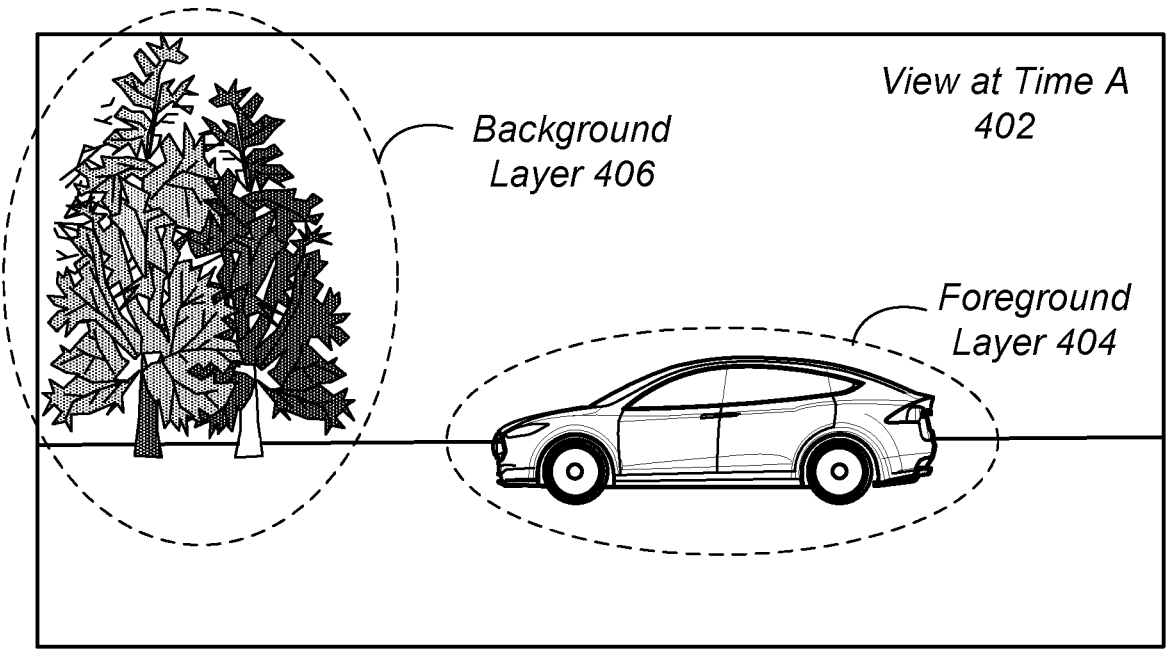
FIG. 4 illustrates an example of combining image information gathered from two frames to artificially render an image in another frame using multiple layers extracted from surround views.
Figure 4:
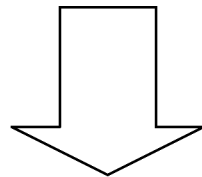
Figure 4:
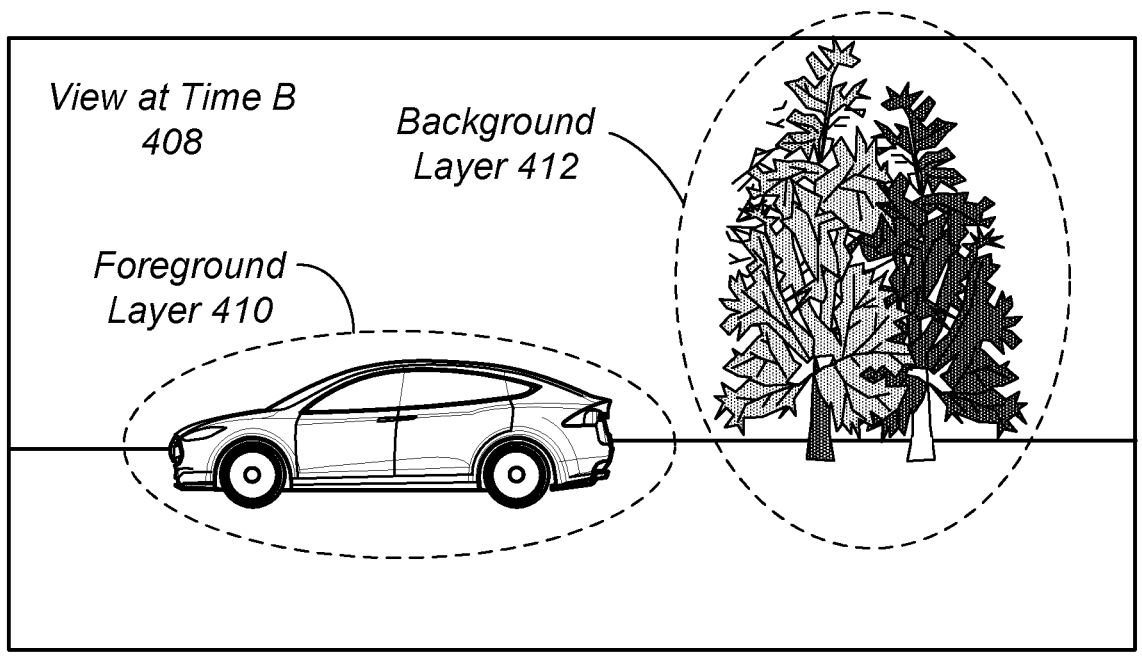

With reference to FIG. 4, shown is an example of combining image information gathered from both Frames A and B to artificially render an image in Frame X by using multiple layers of an image. The present example uses the method described above with regard to FIG. 3, where the first frame and second frame are made up of two or more layers. In particular, the first frame, which includes a view at Time A 402, includes a background layer 406 and foreground layer 404. The second frame, which includes a view at Time B 408, includes a background layer 412 and foreground layer 410. In some examples, the foreground and/or background can include one or more layer. In some embodiments, a layer is a region of image pixels that share a similar motion, based on factors such as depth and or speed of the corresponding real world object.

In the present example, viewpoint-interpolation can be used to generate an artificially rendered image as described above with regard to FIG. 3. In addition, because different motions of the layers can create occlusions and/or regions with missing data, the process can also include methods for filling the regions corresponding to any detected occlusions. Whether data is occluded or missing is based on the ordering of layers. Although the layers are expected to stay in the same order, they can switch order if the objects change their depth location within the scene. For instance, occlusions are created if a first layer moves in front of a second layer, where the first layer is closer to the camera than second layer. In the case that the first layer is not transparent (or non-see-through), image information from the first layer is taken wherever the first and second layer overlap. In the case that the first layer is partially see-through, image information is taken from both layers according to the opacity of the first layer. This process can also be extended to more than two layers.

As described above with regard to FIG. 3, missing information can be obtained in various ways, including interpolation or extrapolation. For instance, missing data can be taken from only one of the frames, depending on which frame includes a view of the missing data. In another example, the missing data can be taken from other frames where this region is visible. For instance, in a surround view that includes various frames and viewpoints, other frames can be used to fill in this missing data. In another example, the missing data can be extrapolated from surrounding image data, to create artificial image data that estimates what the missing data would look like. In yet another example, viewpoint-extrapolation using multiple layers can be applied outside of the trajectory between the two frames, by moving the different layers in perpendicular motion to the trajectory motion, as shown in more detail with regard to FIG. 6. According to various examples, the transform between the two frames can be an image transformation or a 3D transformation. An image transformation can use methods such as homography, affine, similarity, translation, rotation, scale.

For a 3D transformation, layers are moved with respect to their depth and the 3D transformation, according to various embodiments.

Figure 5A:
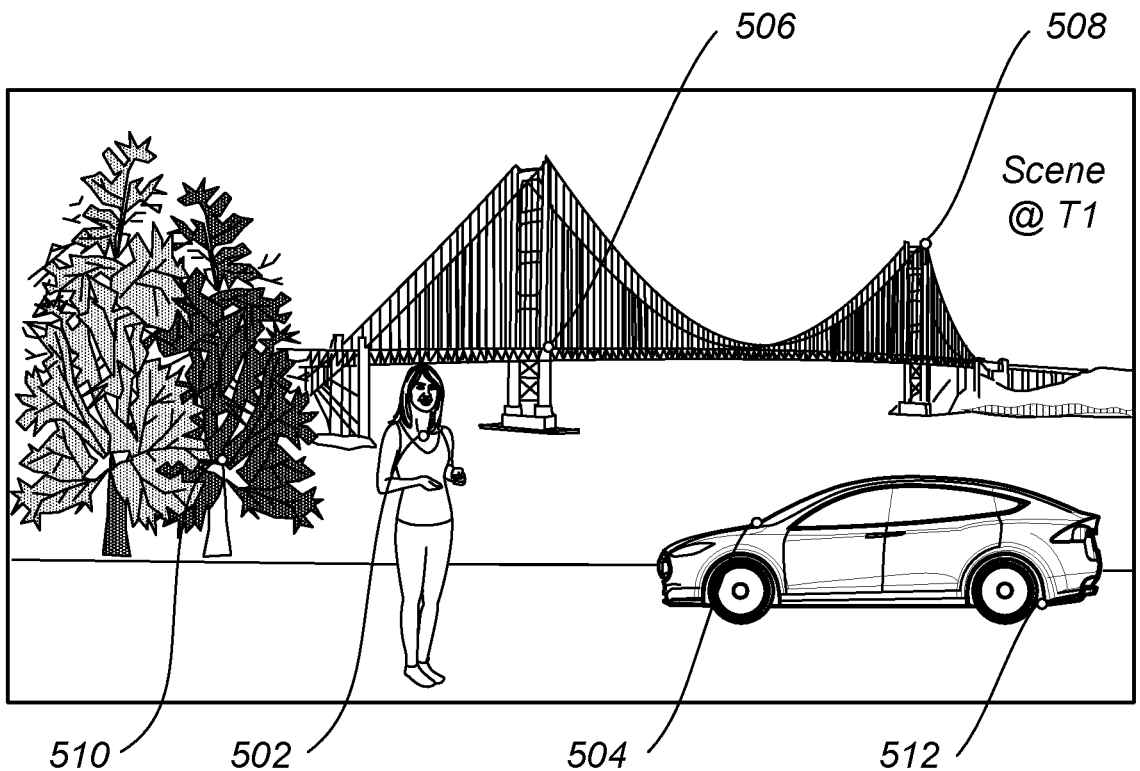
FIGS. 5A-5B illustrate an example of an image transformation between two frames using tracked control points between the two frames.
Figure 5B:
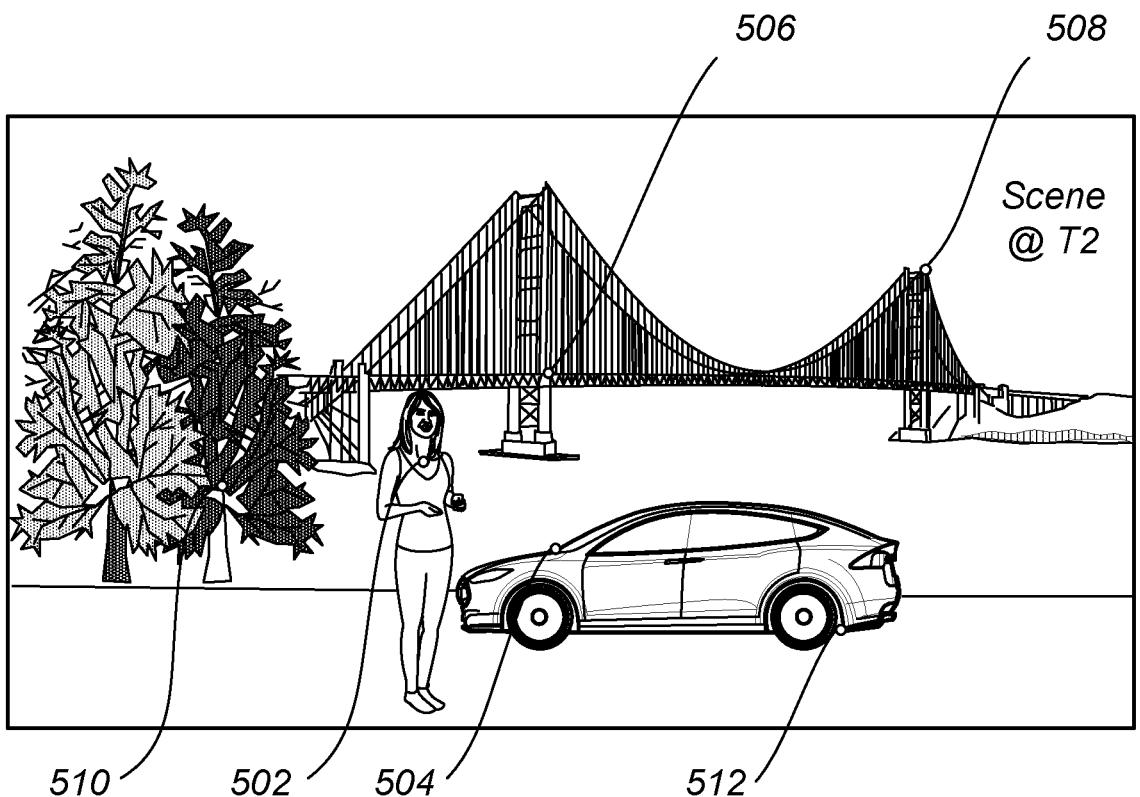

With reference to FIGS. 5A-5B, shown is an example of an image transformation between two frames using tracked control points between the two frames. In particular, FIG. 5A shows a first frame of a scene at a first time T1 and FIG. 5B shows a second frame of the scene at a second time T2. A set of control points 502, 504, 506, 508, 510, and 512 are tracked between the two frames, such that their locations are known in both frames. An intermediate frame X at x\in [0, 1] between these two frames can be generated by interpolating the location of all control points individually for x and then computing the image data for frame X by interpolating all pixel locations using those control points. In some examples, the set of control points are located within a single layer that includes particular objects viewable in the first frame and second frame. In this case, generating an artificially rendered image may include interpolating image data for multiple layers and combining these layers. In other examples, each pixel in the first frame corresponds to a control point in the set of control points. Accordingly, each pixel may be tracked and interpolated in that instance.

In some embodiments, an artificially rendered image is generated as intermediate frame X by tracking a set of control points between the first frame and the second frame, and interpolating individual control points for the third location X using the set of control points and interpolating pixel locations using the individual control points. As shown, the first frame includes a first image captured from a first location and the second frame includes a second image captured from a second location. In one example, interpolating the pixel locations includes interpolation using barycentric coordinates based on three or more control points. In another example, interpolating the pixel locations includes interpolation using splines. In yet another example, interpolating the pixel locations includes interpolation using finite elements. In yet another example, interpolating the pixel locations includes using motion of the nearest control point. In some examples, interpolating pixel locations using the individual control points includes using dense optical flow. In other examples, interpolating pixel locations using the individual control points includes using depth data.

Figure 6:
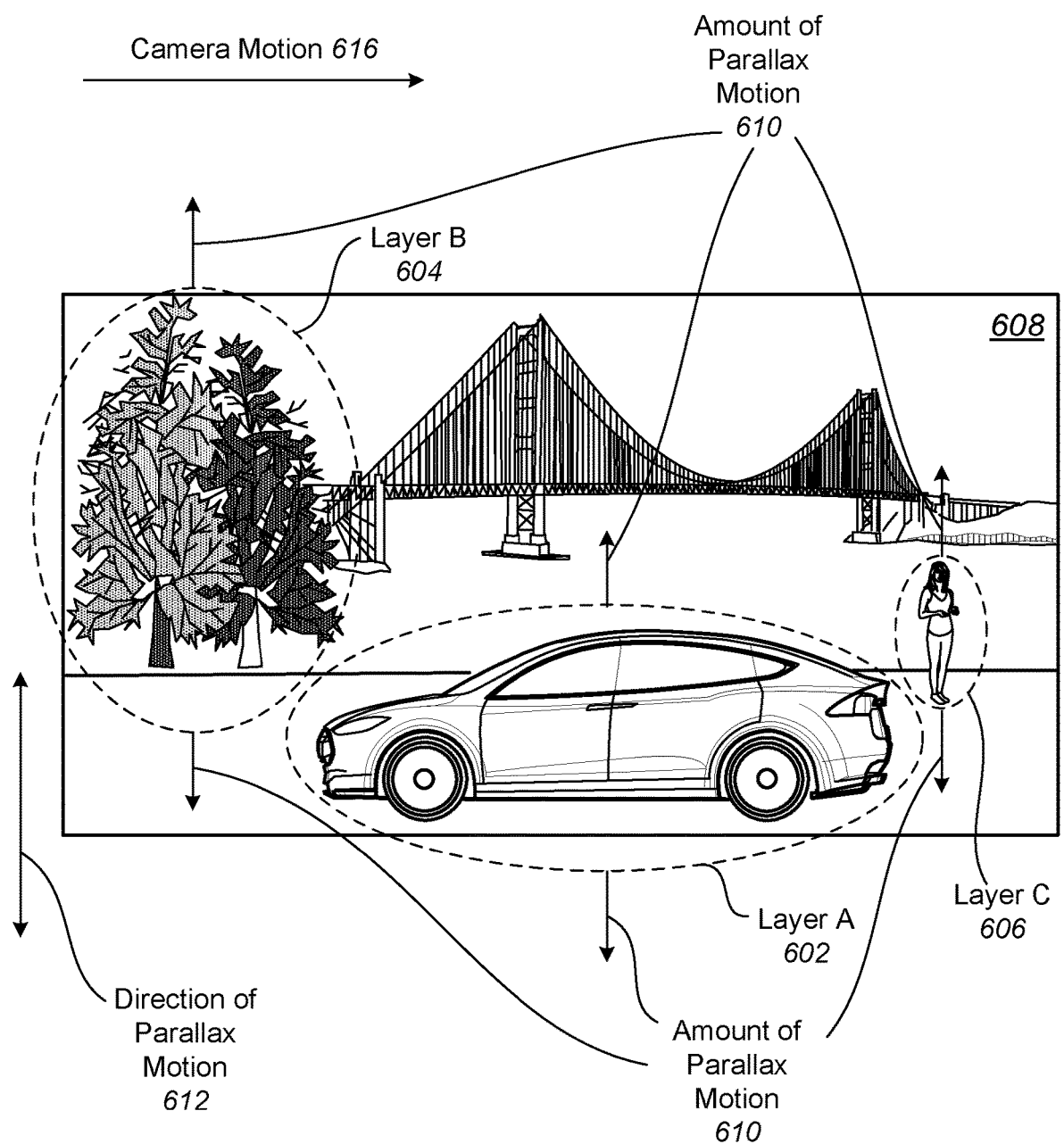
FIG. 6 illustrates an example of viewpoint extrapolation outside of the trajectory between two frames using multiple layers and the parallax effect.

With reference to FIG. 6, shown is an example of viewpoint extrapolation outside of the trajectory between two frames using multiple layers and the parallax effect. Using multiple layers, viewpoint-extrapolation outside of a trajectory between two frames can be achieved by moving the different layers in perpendicular motion to the trajectory motion. As shown, a scene 608 includes multiple layers Layer A 602, Layer B 604, and Layer C 606. Although not shown, two frames capturing images of the scene 608 can be obtained by moving a camera along camera motion 616. Comparing the two images will show parallax motion in the direction 612. As shown in the figure, the amount of parallax motion 610 of each of the layers can indicate movement or differences between the frames. Although not indicated in the figure, the different layers 602, 604, and 606 can each have different amounts of parallax motion.

In the present embodiment an artificially rendered image is generated using this parallax effect. In particular, a set of control points (not shown) is moved perpendicular to a trajectory between a first frame and a second frame. In this example, the first frame includes a first image captured from a first location and the second frame includes a second image captured from a second location and each control point is moved based on an associated depth of the control point.

Specifically, control points located at a further depth are moved less than control points at a closer depth in some examples. Additionally, in some applications, each pixel in the first image corresponds to a control point in the set of control points. Furthermore, in addition to having a concrete depth associated with a point, it is also possible to infer the depth from the amount of frame-to-frame motion of the control points.

Next, an artificially rendered image corresponding to a third location outside of the trajectory is generated by extrapolating individual control points using the set of control points for the third location and extrapolating pixel locations using the individual control points. In some examples, extrapolating the pixel locations includes extrapolation using barycentric coordinates based on three or more control points. In other examples, extrapolating the pixel locations includes extrapolation using splines. In yet other examples, extrapolating the pixel locations includes extrapolation using finite elements. In other instances, extrapolating the pixel locations includes using motion of a nearest control point. In yet other instances, extrapolating pixel locations using the individual control points includes using dense optical flow.

Figure 7:
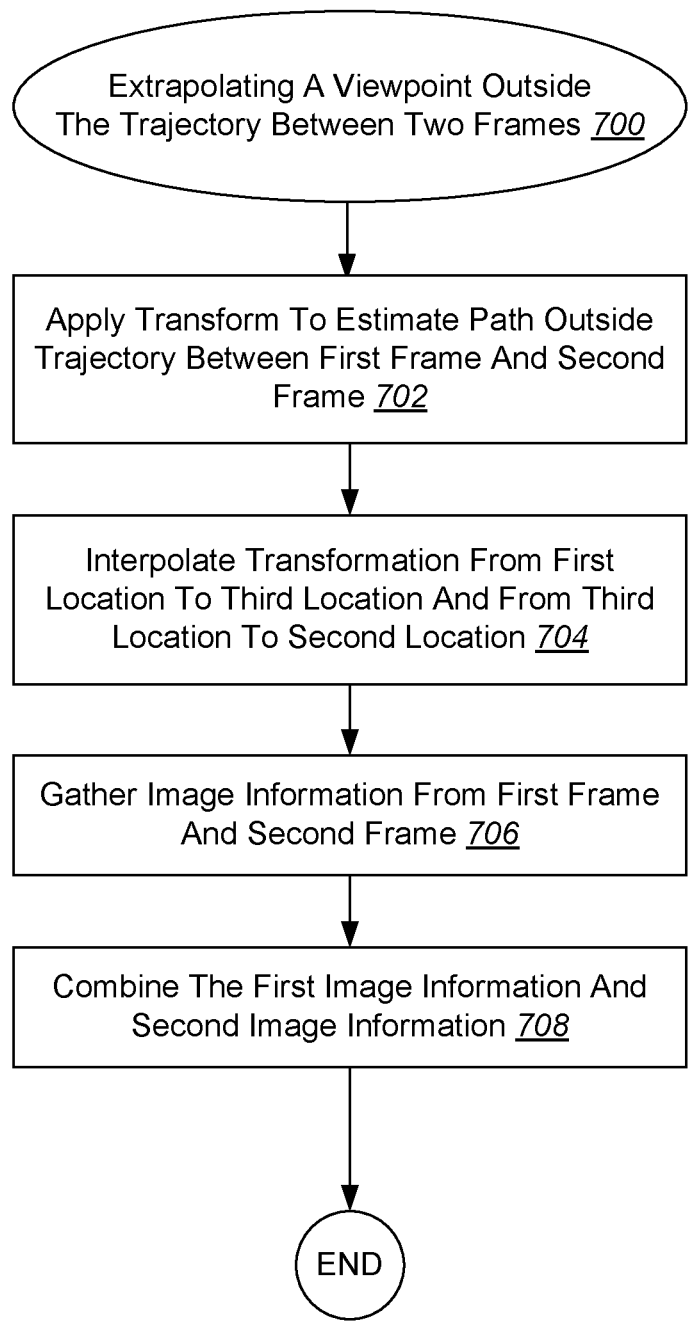
FIG. 7 illustrates an example of a process for extrapolating a viewpoint outside the trajectory between two frames.

With reference to FIG. 7, shown is an example of a process 700 for extrapolating a viewpoint outside the trajectory between two frames. This process can be viewed as an extension to the process described with regard to FIG. 3, where viewpoints for locations outside of the trajectory between Frame A and Frame B are extrapolated by applying a transform which warps the image according the curvature and direction of the estimated path.

In the present embodiment, a transform is applied to estimate a path outside the trajectory between a first frame and a second frame at 702. The first frame includes a first image captured from a first location and the second frame includes a second image captured from a second location. In some examples, the first image and second image are associated with the same layer. Furthermore, this process can be applied to various layers and the resulting images representing the layers can be combined to generate a complete image. Next, an artificially rendered image corresponding to a third location positioned on the path is generated. The artificially rendered image is generated by first interpolating a transformation from the first location to the third location and from the third location to the second location at 704. Image information is then gathered from the first frame and the second frame at 706 by transferring first image information from the first frame to the third frame based on the interpolated transformation and second image information from the second frame to the third frame based on the interpolated transformation. Finally, the first image information and the second image information is combined at 708.

According to present embodiment, the transform can implement various features. For instance, the transform can implement features such as homography, spherical projection, and/or cylindrical projection. These features can be used alone or in conjunction with one another in applying the transform. Additional features not mentioned can also be implemented within the scope of this disclosure.

The present embodiment describes one method of extrapolating a viewpoint outside the trajectory between two frames. However, additional methods for extrapolating such viewpoints can also be implemented in other embodiments. For instance, as described above with regard to FIG. 6, another way to extrapolate viewpoints for locations outside of the trajectory between two frames can include moving the layers and/or control points perpendicular to the trajectory direction based on their depth. Specifically, layers/control points at greater depth are moved less than layers/control points at lesser depth. Depending on the characteristics of the frames, different methods can be chosen to provide an appropriate result.

Figure 8:
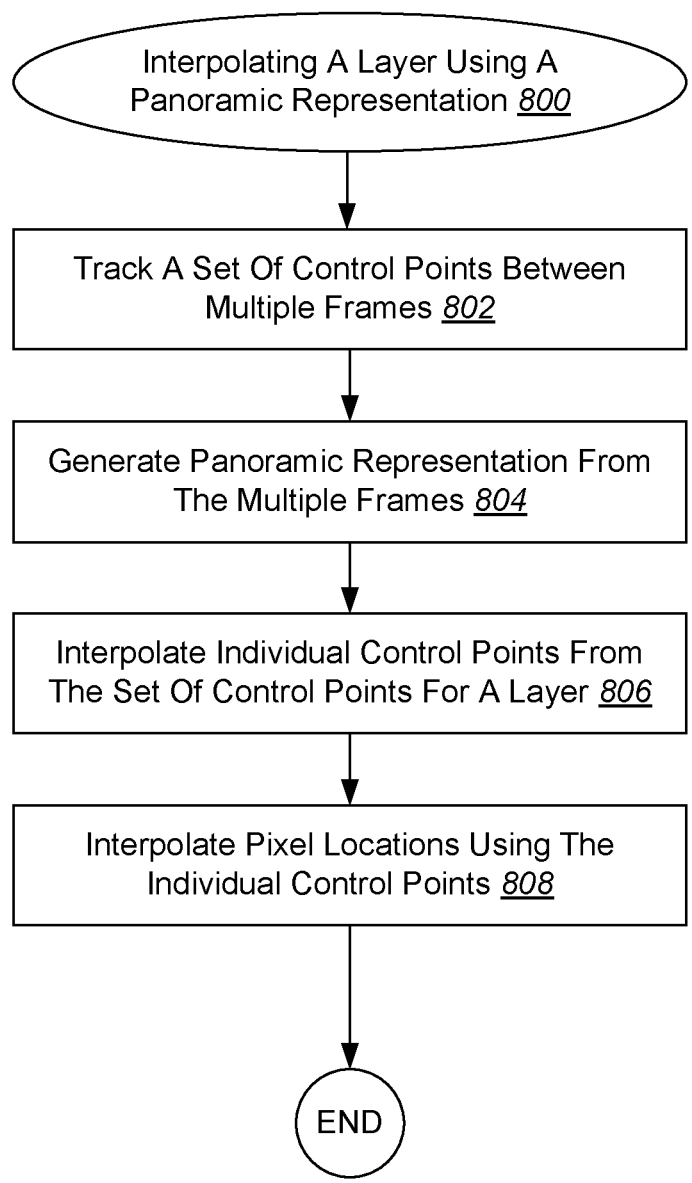
FIG. 8 illustrates an example of a process for interpolating a layer using a panoramic representation.

With reference to FIG. 8, shown is an example of a process 800 for interpolating a layer using a panoramic representation. In this example, the span of a layer is not restricted to two frames but is constructed from multiple frames. Specifically, a panorama is created from the corresponding background regions and combined into a panoramic representation. This panorama representation is then used to interpolate the corresponding layer. Although this process is described in terms of a background layer, this process can also be extended to other types of layers. For instance, the process can be applied to layers that include objects, such as context layers.

In the present embodiment, a set of control points is tracked between multiple frames associated with the same layer at 802. In some examples, each pixel corresponds to a control point in the set of control points. In these cases, each pixel is then interpolated based on the set of control points for the artificially rendered image. Next, a panoramic representation is generated from the multiple frames at 804. Individual control points are then interpolated from the set of control points at 806 for a desired frame or layer. Pixel locations are then interpolated for this frame or layer using the individual control points at 808. From this interpolation, the artificially rendered image/layer is generated.

According to various embodiments, interpolation can be implemented using a variety of methods. For instance, interpolating the pixel locations can include interpolation using barycentric coordinates based on three or more control points. In some examples, interpolating the pixel locations includes interpolation using splines. In other examples, interpolating the pixel locations includes interpolation using finite elements. In yet other examples, interpolating the pixel locations includes using motion of a nearest control point. In addition, interpolating pixel locations using the individual control points includes using dense optical flow in some applications. Although particular examples of interpolation methods are described, any combination of these or other methods can be used.

Figure 9:
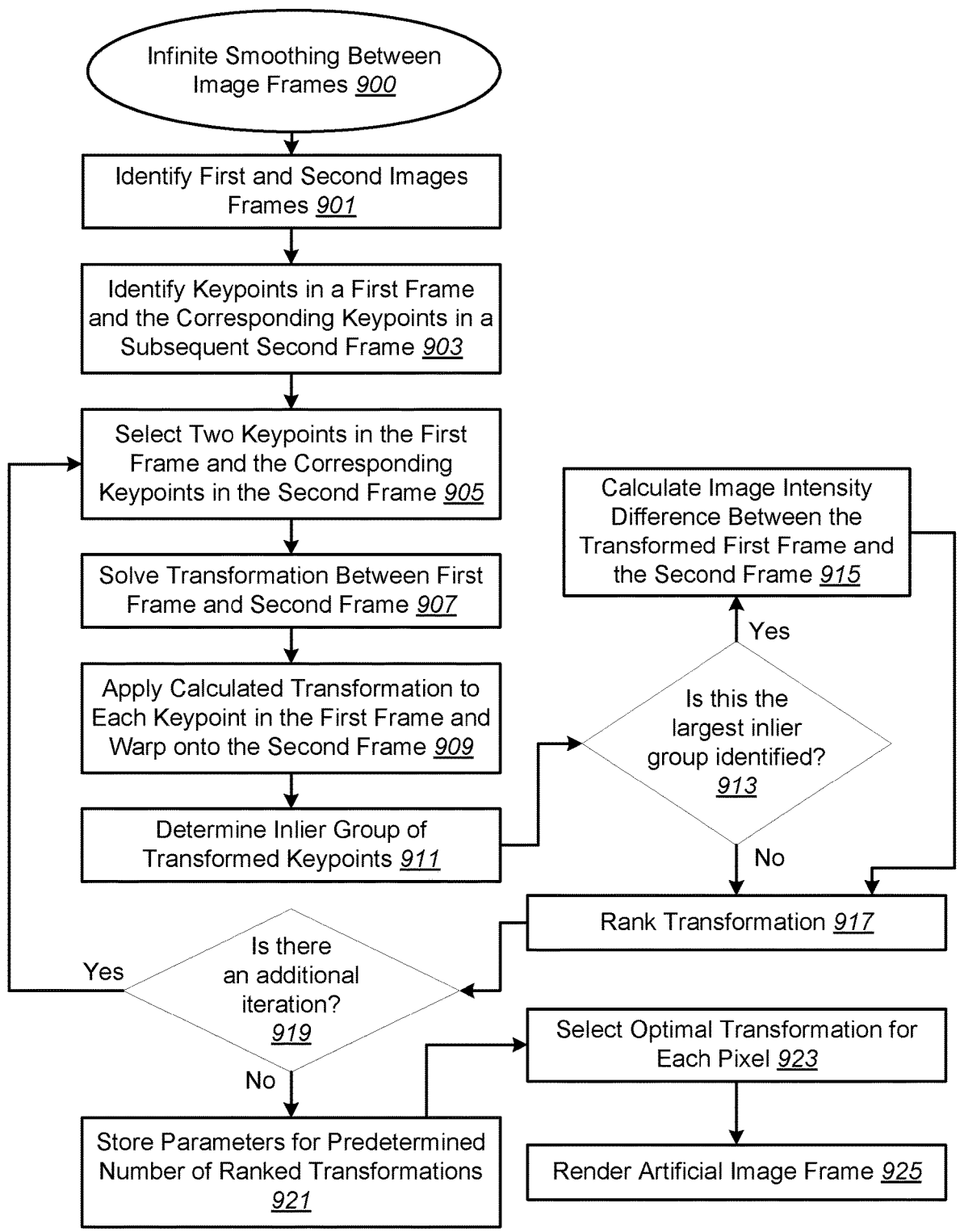
FIG. 9 illustrates an example of a method for infinite smoothing between image frames, in accordance with one or more embodiments.

With reference to FIG. 9, shown is an example of a method 900 for infinite smoothing between image frames, in accordance with one or more embodiments. In various embodiments, method 900 may be implemented as one or more various steps in method 300, such as estimating transformation at step 302 and/or interpolating the transformation at step 304. In various embodiments, process 900 may be implemented to parameterize a transformation, such as T_AB, described with reference to FIG. 1, for interpolation those parameters during runtime.

At step 901, first and second image frames are identified. In some embodiments, the first and second image frames may be part of a sequence of images captured as described with reference to FIG. 1. In various embodiments, the image frames may be consecutively captured images in time and/or space. In some embodiments, the first and second image frames may be adjacent image frames, such as frame N and frame N+1. The method 900 described herein may be implemented to render any number of frames between N and N+1 based on the position of the user and/or viewing device.

A RANSAC (random sample consensus) algorithm may be implemented to determine the possible transformation candidates between the two image frames. As described herein, transformation candidates may be identified from keypoints tracked from a first frame to a second frame. Various transformations may be calculated from various different parameters gathered from various combinations of keypoints. At step 903, keypoints in the first frame and corresponding keypoints in the second frame are identified. In some embodiments, the first frame includes an image that was captured before the image in the second frame. In other embodiments, the first frame may include an image captured after the image in the second frame. In various embodiments, keypoints may be identified using a Harris-style corner detector algorithm or other keypoint detection method. In other embodiments, various other corner detection algorithms may be implemented, such as a Moravec corner detection algorithm, a Forstner corner detector, etc. Such corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. For example, 1,000 keypoints may be identified and selected on the first frame. The corresponding 1,000 keypoints on the second frame can then be identified using a Kanade-Lucas-Tomasi (KLT) feature tracker to track keypoints between the two image frames.

At step 905, two keypoints in the first frame and the corresponding keypoints in the second frame are selected. In some embodiments, the two keypoints in the first frame may be selected randomly by the RANSAC algorithm. The two corresponding keypoints in the second frame may be identified by the KLT feature tracker. In some embodiments, two keypoints may be randomly selected in the second frame and the corresponding keypoints in the first frame are identified. Each pair of corresponding keypoints may be referred to herein as a correspondence. For example, keypoint A on frame N and keypoint A' on frame N+1 correspond to each other via KLT feature tracking and may comprise a pair (A, A'). A second correspondence (B, B') may be selected at step 1105 which comprises keypoint B on frame N and keypoint B' on frame N+1.

Based on the two keypoint correspondences, a transformation is determined between the first frame and the second frame, at step 907. In some embodiments, a set of two keypoint correspondences are used to determine a transformation. In other words, a transformation, T1, between the first frame and second frame may be calculated from the two corresponding pairs of keypoints using a predetermined algorithm. Various parameters may be used to calculate the transformation between corresponding keyframes by a predetermined algorithm. In one example embodiment, similarity 2D parameters, including x and y translations, a 2D rotation, and a 2D scale, may be used to determine the translation. Other parameters that may be used include 2D translation (x and y translation), 2D Euclidean parameters (2D rotation and x,y translation), affine, homography, etc. As another example, a mathematical model may be used, such as that provided in M. Brown, R. Hartley, and D. Nister. Minimal solutions for panoramic stitching. In Proceedings of the International Conference on Computer Vision and Pattern Recognition (CVPR07), Minneapolis, June 2007. In order to calculate a transformation based on rotation and focal length, four parameters are required: three for rotation and one for focal length. In the above examples, four constraints can be provided by the two correspondences for each selected keypoints between frames. The derived close-form solution is the calculated transformation based on the two selected keypoint correspondences.

At step 909, the calculated transformation T1 is applied to each keypoint in the first frame which is warped onto the second frame. In other words, all keypoints in the first frame are transformed to the second image via applying the calculated transformation. The transformation is reversible and in some embodiments, the keypoints in the second frame may be transformed onto the first frame after the calculated transformation is applied to keypoints in the second frame. At step 911, an inlier group of transformed keypoints is determined. In some embodiments, a transformed keypoint in the first frame is considered an inlier if the transformation T1 correctly transforms the keypoint to match the corresponding keypoint in the second frame. In some embodiments, this can be determined by computing the L2 distance between a transformed keypoint and its corresponding keypoint on the second image. For example, a transformed keypoint on a first frame N may be denoted as $K\hat{}$ and its corresponding keypoint on the second frame N+1 may be denoted as K'. The L2 distance is computed as $\|A\hat{}-A'\|$, which corresponds to the distance between two 2D points. If the distance between any keypoint correspondence is within a predetermined threshold distance in any direction, then the correspondence will be determined to be an inlier. In other words, if the difference between any keypoint correspondence is greater than the predetermined threshold distance, then the keypoint will be determined to be an outlier.

For example, the threshold distance may be a threshold pixel distance, which is the L2 distance between two keypoints in a correspondence. Thus, if the distance between a keypoint $K\hat{}$ and its corresponding keypoint K' is more than 2 pixels, then that keypoint correspondence will be determined to be an outlier based on the transformation applied at step 909. In various embodiments, the threshold pixel distance may be a function of image resolution and can scale linearly. For example, method 900 may be processing images at a 320×180 pixels resolution and use a threshold pixel distance of 2 pixels. However, if method 900 is used to process images at a 1080p (1920×1080 pixels) resolution, then a threshold pixel distance of 6-8 pixels may be used. In some embodiments, a different threshold pixel distance may be chosen for a given image resolution. In some embodiments, the threshold pixel distance may be empirically determined based on experimental results of accuracy.

After all keypoint correspondences have been measured as such, it is determined at step 913 whether the calculated transformation T1 resulted in the largest inlier group compared to previous transformations. If the transformation T1 applied at step 909 does not result in the largest group of inlier keypoints, the calculated transformation T1 is ranked at step 917. In other words, if a larger inlier group was identified based on a previous transformation, T0, calculated at step 907 and applied at step 909, then the current calculated transformation T1 is ranked against the previous transformation T0. In some embodiments, the transformations are then ranked based on the size of the resulting inlier group. For example, a transformation resulting in a larger inlier group may be ranked higher than a transformation resulting in a smaller inlier group.

If the transformation T1 determined at step 907 results in the largest group of inlier keypoints than any previous transformation T0, then the image intensity difference between the transformed first frame and the second frame is calculated at step 915. In some embodiments, the calculated transformation T1 may be applied to every pixel in the first frame to warp the first frame onto the second frame, and an image intensity difference is calculated between the transformed first frame and the second frame. For example, an error or difference for each color channel is calculated between each corresponding pixel in the two frames. Then an average error of the RGB value of all color channels is derived for each pixel. Next, the average error for all pixels within the first and second frames is calculated. In some embodiments, the image intensity difference between two frames will be between 0 and 255. A lower image intensity difference value corresponds to a closer image match between frames, and consequently a more accurate transformation. If the transformation T1 calculated at step 907 is the first calculated transformation within the RANSAC algorithm, then it may necessarily result in a largest group of inlier keypoints and the image intensity different resulting from that transformation will be calculated at step 915.

The transformation T1 may then be ranked at step 917. In some embodiments, the transformation T1 is ranked against a previous transformation T0 that previously resulted in the largest inlier group. If transformation T1 results in a lower image intensity difference, then it may be ranked higher than transformation T0. If transformation T1 results in a high image intensity difference, then it may be ranked lower than transformation T0. If image intensity difference results from other previous transformations have also been calculated, transformation T1 may be ranked against such previous transformations based on its resulting image intensity difference.

In some embodiments, by calculating image intensity difference at step 915 only when a new largest resulting inlier group is determined, processing time may be faster because the system does not need to calculate image intensity difference for every transformation solved at step 907. However, in some embodiments, step 915 is implemented to calculate the image intensity difference for all transformations determined at step 907, regardless of inlier group size. In such embodiments, all transformations may be ranked based on resulting image intensity difference.

There may be instances where a larger inlier group is determined at step 913, but a higher image intensity difference value is calculated at step 915. In this instance, the transformation resulting in the higher image intensity difference value will be discarded. Alternatively, the transformation resulting in the larger inlier group may be stored in some embodiments. Such instances are more likely to occur in instances where stabilization of foreground is desired in image frames that include large textured background regions. Accordingly, the RANSAC algorithm may result in calculated transformations that include large inlier keypoint sets that correspond to the large background, instead of the foreground. This may result in higher intensity error in the foreground region. To compensate for this in some embodiments, the RANSAC algorithm may measure focal length and rotation using only keypoints located in the foreground of an image. A background keypoint removal may be performed on the image frames within a sequence of images before the RANSAC algorithm is implemented. Keypoints corresponding to the background of an image may be identified based on IMU data to calculate how such keypoints with focal points at infinity should move between frames. Once identified, such background keypoints are removed, such that the RANSAC algorithm calculated transformations at step 1107 using only keypoints corresponding to the foreground. This may reduce undesired transformations resulting in larger inlier groups (aligning the background), but higher image intensity difference values (from unaligned foreground). Such background keypoint removal may also be used with concave surround views, such as the surround view depicted in FIG. 6B. In convex panoramic surround views, calculating transformations from keypoints corresponding to the background and the foreground may be desired.

In some embodiments, step 915 is only implemented if a new largest inlier group is determined at 913. The transformation calculated at step 907 in a first iteration of the RANSAC algorithm may necessarily result in the largest inlier group. In other embodiments, step 915 may be implemented if the inlier group determined at 913 is at least equal to the largest inlier group resulting from a previous transformation. In rare instances, a subsequent transformation calculated at step 907 may result in the same inlier group size, as well as the same image intensity difference. In such instance, the transformation calculated first may be ranked higher at step 917. In other embodiments, the subsequent transformation is kept while the previous transformation discarded.

It is then determined whether the RANSAC algorithm includes an additional iteration for sampling additional keypoint correspondences for solving subsequent transformations at 919. The RANSAC algorithm of method 900 may be configured to continue for any number of cycles in which it randomly samples sets of keypoint correspondences. For example, the RANSAC algorithm may perform steps 905 through 917 one hundred times for two adjacent frames. However, the RANSAC algorithm may be performed any number of cycles desired.

If it is determined that there are additional iterations for the RANSAC algorithm at step 919, method 900 may return to step 905 to select another two correspondence of keypoint pairs. In some embodiments, keypoint correspondences may be selected randomly. In other embodiments, corresponding keyframes may be selected by location. Subsequently selected keypoint correspondences may include different randomly selected pair of keypoints in the first frame. In some instances, randomly selected keypoint correspondences may be correspondences that were previously selected at step 1105. For example, correspondence (A, A') and a third corresponding keypoint pair (C, C') may be selected in the second iteration of the RANSAC algorithm. In even rarer occasions, the same exact keypoint pairs may be selected in subsequent iterations of the RANSAC algorithm. For example, a subsequent iteration of the RANSAC algorithm may again select correspondences (A, A') and (B, B'). In this case, the resulting inlier group size and calculated image intensity difference would be identical to the previously calculated transformation based on the previous iteration. In this instance, the first transformation will be ranked higher at step 917 and the subsequent iteration involving the same calculated transformation will be ranked lower. However, the probability of such occurrence may be very unlikely depending on the number of keypoints identified on an image frame, for example, 1,000 keypoints. Thus, the chance occurrence of this instance can simply be ignored.

The result of method 900 is list of transformations between the first frame and the second frame, ranked based on the resulting inlier keypoint group size and/or image intensity difference when the transformation is applied to the first frame and warped onto the second frame, or vice versa. The optimal transformation between the two adjacent frames may then be used to compose a trajectory for the image sequence at step 1005 of method 1000.

Once all iterations of the RANSAC algorithm have been run, parameters are stored for a predetermined number of highest ranked transformations at step 921. In various embodiments, a predetermined number of highest ranking transformations are selected to be transformation candidates. For example, the eight highest ranked transformations solved at step 907 may be selected as transformation candidates. As previously described, the transformations may be ranked by largest resulting inlier keypoint group and/or smallest resulting image intensity difference. In some embodiments, the remaining transformations solved at step 907 are discarded. Any number of transformation candidates may be selected. However, in some embodiments, the number of transformations selected as transformation candidates is a function of processing power.

For example, eight candidates may be selected from transformations solved using similarity 2D parameters. Thus, for the transition between frame N and N+1, eight sets of four parameter vectors are stored. As previously described, the transformation parameters based on similarity 2D parameters include x and y translations, 2D rotation, and 2D scale. Thus, 32 parameter vectors may be stored for each transition between frames. In some embodiments, processing time may increase linearly with increased number of candidates. In some embodiments, steps 903 to 921 are run offline. In some embodiments, steps 903 to 921 are run in real-time, as image frames are captured.

At step 923, the optimal transformation candidate is selected for each pixel. Each pixel in an image may experience a different optimal transformation between frames. In some embodiments, each of the transformation candidates is applied to each pixel. The transformation candidate that results in the least difference between pixels from each frame may be selected. For example, an artificial frame N+0.5 may be rendered based on user selection. In some embodiments, user selection may correspond to the location a viewing device. In other embodiments, user selection may correspond to user input on a viewing device, such as by swiping a screen left or right to change the viewing location. For example, as described in U.S. patent application Ser. No. 14,530,669, previously referenced above, a user action may be received to view the object of interest from a desired viewpoint. This user action can include moving (e.g. tilting, translating, rotating, etc.) an input device, swiping the screen, etc., depending on the application. For instance, the user action can correspond to motion associated with a locally concave surround view, a locally convex surround view, or a locally flat surround view, etc. Based on the characteristics of the user action, the three-dimensional model may be processed. For instance, movement of the input device can be detected and a corresponding viewpoint of the object of interest can be found. Depending on the application, the input device and output device can both be included in a mobile device, etc. In some examples, the requested image corresponds to an image captured prior to generation of the surround view. In other examples the requested image is generated based on the three-dimensional model (e.g. by interpolation, etc.).

In some embodiments, each of the eight transformation candidates is applied to each pixel in the first frame and second frames. In some embodiments, each transformation candidate is applied to a pixel in the first frame N and a corresponding pixel in the second frame N+1 to linearly interpolate each pixel to the desired frame location, such as N+0.5. The corresponding pixels are then compared to determine how closely the two interpolated pixels match in order to determine the optimal transformation candidate for such pixels.

For example, a transformation candidate is applied to a pixel in the first frame N, and the translation, rotation, and scale may be linearly interpolated for the N+0.5 frame location. Then the transformation candidate is applied to a pixel in the second frame N+1, and the translation, rotation, and scale may be linearly interpolated in reverse for the N+0.5 location. Both interpolated pixels may then be compared to measure an image intensity difference based on the RGB values for each pixel.

In some embodiments, the optimal transformation candidate corresponds to the transformation that results in the lowest image intensity difference between the two interpolated pixels. In some embodiments, all transformation candidates may be applied to each pixel in an image frame, and all resulting image intensity differences are compared. If the same image intensity difference results from different applied transformation candidates, the first transformation candidate applied may be selected as the optimal transformation candidate in certain embodiments. In further embodiments, transformation candidates may be sequentially applied to a pixel until a transformation candidate results in an image intensity difference below a certain predetermined threshold value, at which point it is selected as the optimal transformation.

In some embodiments, each transformation candidate is applied to linearly interpolate each pixel on the first frame N to the second frame N+1. The resulting interpolated pixel is then compared to the corresponding pixel in the second frame N+1 to determine the image intensity difference as described above. In other embodiments, each of the transformation candidates is applied to a group, or "community," of pixels. For example, a community of pixels may comprise a 7×7 (−3, +3) group of pixels.

In some embodiments, a graphics processing unit (GPU) is used to implement step 923. The GPU may be a specialized processing unit that is included in a viewing device, such as GPU 1209 described below with respect to FIG. 12. In some embodiments, each pixel is processed as a separate thread of the GPU. Thus, time complexity of the processing time for each pixel is at constant time, bounded by $O(1)$ and not $O(n)$, where n is the number of processed elements (or pixels). This causes the processing time to be the same regardless of the size of the image being interpolated because the process is bounded by a value that does not depend on the size of the input.

Once an optimal transformation candidate is determined for each pixel, an artificial image may be rendered at step 925 using the optimal transformation. In some embodiments, step 925 may also be implemented by the same GPU as described above. In other embodiments, an a different processing unit may be used to render the interpolated image. As previously described, in various embodiments, steps 923 and 925 may be performed on-the-fly during runtime when the user is viewing the sequence of images. In such embodiments, the applied transformation may be a function of frame number of the frame between N and N+1. The number of frames between N and N+1 may be determined based on various considerations, such as the speed of movement and/or the distance between frames N and N+1. For example, if a user selection corresponds to slower swipes and/or movement of the image location, then more artificial frames may be rendered, such as every 0.1 translation between N and N+1. However, if a user selection corresponds to faster swipes and/or movement of the image location, then fewer artificial frames may be required, such as every 0.25 translation between N and N+1.

As described, one or more steps in method 900 may be performed offline before a user accesses the image frames to view a surround view. However, various embodiments, one or more steps in method 900 may be performed during runtime. In some embodiments, all steps may be performed during runtime.

Because method 900 may generate any number of frames between frames N and N+1, the user may perceive a smooth transition as the user view different viewpoints of the three-dimensional model of an object of interest, as an image frame may be rendered for virtually any viewpoint position the user is requesting to view. Furthermore, because the artificial image frames may be rendered based only on the calculated transformation parameters stored at step 921, storage of additional artificially rendered image frames is not required. This enhances the functioning of image processing computer systems by reducing storage requirements.

Method 900 may then be implemented for the transition between each image frame in the sequence. Various embodiments of method 900 may provide advantages over existing methods of rendering artificial images, such as alpha blending. Especially in the case of concave surround views, existing methods result in artifacts or ghosting effect from improperly aligned image frames. This occurs because unlike convex surround views, concave and/or flat surround views do not experience a single transformation for all pixels and/or keypoints. Method 900 provides a process for determining the optimal transformation out of multiple transformation candidates to apply to a pixel. Additionally, method 900 may generate image frames that are seen, as well as portions of image frames that are unseen. Thus, motion between two discretized image frames may be generated by selecting the frame that includes the least amount of conflict.

Furthermore, by providing multiple transformation candidates to be selected during runtime, method 900 provides the ability for optical flow discretization. In other words, which optical flow to use is determined at runtime, unlike existing processes where the optical flow is determined first. Such existing methods establish an optical flow first before determining one or more optimal transformations to be applied. However, this precludes the option to apply a one or more different optical flows other than the precomputed optical flow. Because method 900 allows a different optical flow to be utilized in interpolation of each pixel, an otherwise incorrect optical flow may be used to render a correct image result if the transformation results in the lowest image intensity difference value. This may reduce the probability of artifacts, which may occur in existing methods, even when a correct optical flow is used.

The same principal may also allow the interpolated frames to clearly depict motion occurring between image frames. For example, if an object of interest, or other content and/or context, is moving as the frames for the surround view are captured, there may be a non-linear trajectory in the optical flow because pixels corresponding to a moving object within a sequence of images may not follow a linear translation, such as the translation of the camera. Thus, existing methods, such as alpha blending, can lead to artifacts because there may not be any overlapping subject matter between two frames for a moving object. However, the option to select from various different transformation candidates in method 900 may allow for non-linear motion capture, which can interpolate non-overlapping subject matter.

Figure 10A:
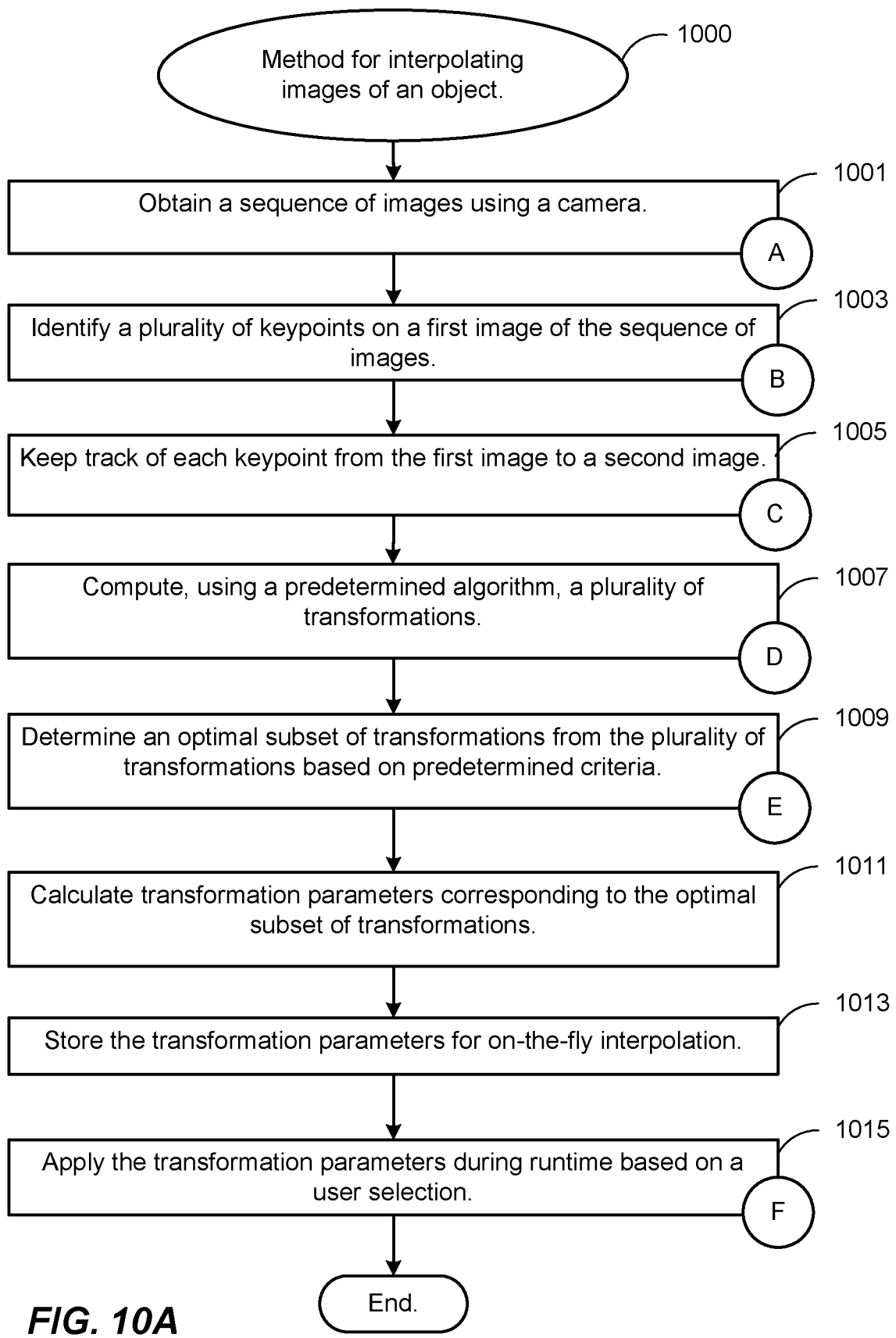
FIGS. 10A-10C illustrate an example method for interpolating images of an object, in accordance with one or more embodiments.
Figure 10B:
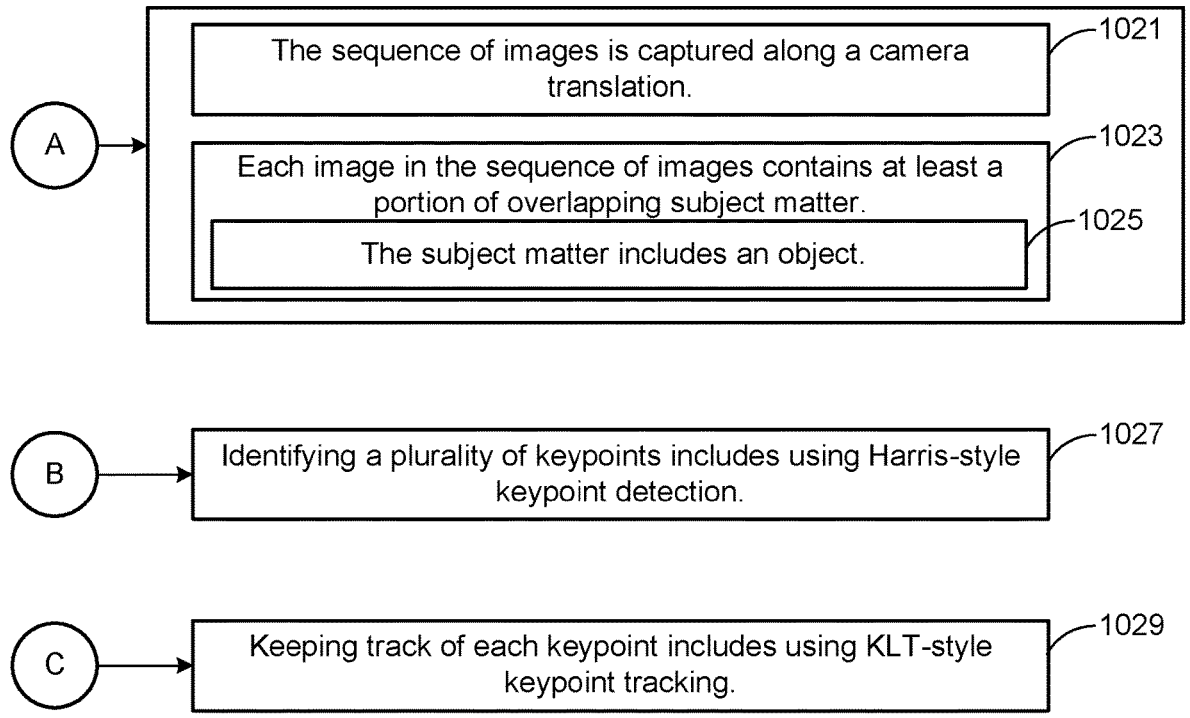
Figure 10C:
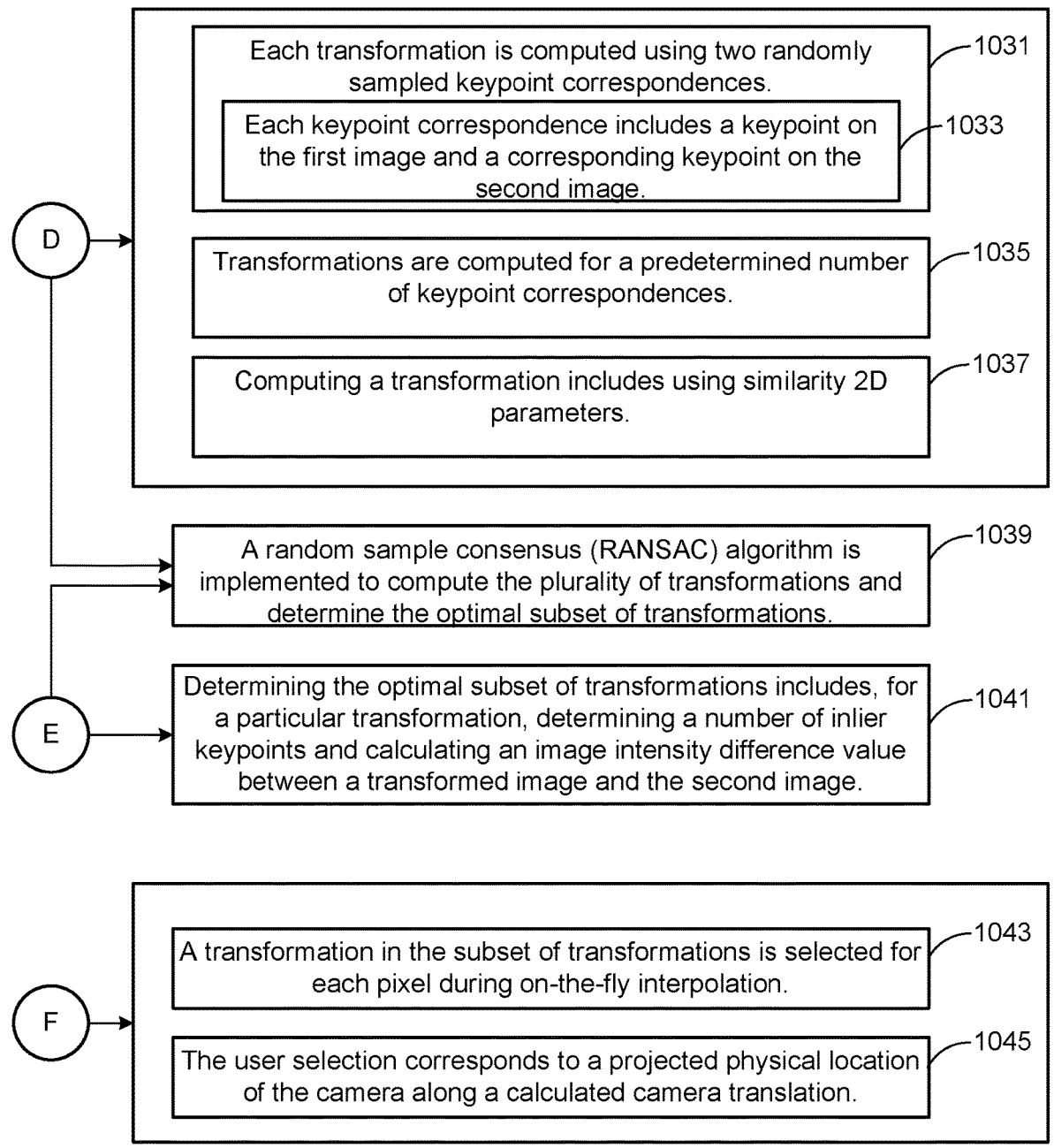

With reference to FIGS. 10A-10C, shown is an example method 1000 for interpolating images of an object, in accordance with one or more embodiments. At operation 1001, a sequence of images is obtained using a camera, such as described with reference to FIG. 1. In some embodiments, the sequence of images is captured along a camera translation 1021. For example, the camera translation 1021 may be a concave arc around an object of interest, such as object 108. In other embodiments, camera translation 1021 may be a convex arc capturing a panoramic surround view. In yet further embodiments, camera translation 1021 may be a linear motion capturing a locally flat surround view, in which the rotation of the camera is small compared to the translation. As an example, the camera translation 1021 may be a concave arc movement capturing a concave surround view around an object.

In some embodiments, each image in the sequence of images contains at least a portion of overlapping subject matter 1023. In some embodiments, the subject matter 1023 includes an object 1025. For example, object 1025 may be an object of interest 108, as described in FIG. 3. In some embodiments, the subject matter 1023 may additionally, and/or alternatively, include context scenery such as objects 110, as described in FIG. 1, or other context.

As previously described with reference to step 903, keypoints in a first frame and corresponding keypoints in a second frame are identified at operations 1003 and 1005. At operation 1003, a plurality of keypoints is identified on a first image of the sequence of images. In some embodiments, identifying a plurality of keypoints includes using Harris-style keypoint detection 1027. At operation 1005, each keypoint is kept track of form the first image to a second image. In some embodiments, keeping track of each keypoint includes using KLT-style keypoint tracking 1029.

At operation 1007, a plurality of transformations 1031 is computed using a predetermined algorithm, such as described with reference to step 907. In some embodiments, each transformation 1031 is computed using two randomly sampled keypoint correspondences 1033. Each keypoint correspondence 1033 may include a keypoint on the first image and a corresponding keypoint on the second image. In some embodiments, transformations 1031 are computed for a predetermined number 1035 of keypoint correspondences 1033. For example, a random sample consensus (RANSAC) algorithm may be configured to select 1,000 sets of two keypoint correspondences, which are used to compute transformations 1031 and determine an optimal subset of transformations 1041, further described below.

In some embodiments, computing a transformation 1031 includes using similarity 2D parameters 1037. As previously described, other parameters may be used, including 2D translation, 2D Euclidean parameters, affine, homography, and/or rotation and focal length. At operation 1009, an optimal subset of transformations 1041 is determined from the plurality of transformations 1031 based on predetermined criteria, such as described with reference to steps 909 to 919. For example, determining the optimal subset of transformations 1041 may include, for a particular transformation 1031, determining a number of inlier keypoints and calculating an image intensity difference value between a transformed image and the second image. In some embodiments, a random sample consensus (RANSAC) algorithm 1039 is implemented to compute the plurality of transformations 1031 and determine the optimal subset of transformations 1041.

At operation 1011, transformation parameters corresponding to the optimal subset of transformations 1041 is calculated. At operation 1013, the transformation parameters are stored for on-the-fly interpolation 1043, such as described with reference to step 921. At operation 1015, the transformation parameters are applied during runtime based on a user selection 1045, such as described with reference to step 923. In some embodiments, a transformation in the subset of transformations 1041 is selected for each pixel during on-the-fly interpolation 1043. In some embodiments, the user selection 1045 corresponds to a projected physical location of the camera along a calculated camera translation. For example, a user may make a user selection 1045 of a particular camera location during runtime, such as by swiping the screen of a viewing device. The system may then determine, on-the-fly, the optimal transformation for each pixel based on that camera location and render the correct image in real-time.

Figure 11:
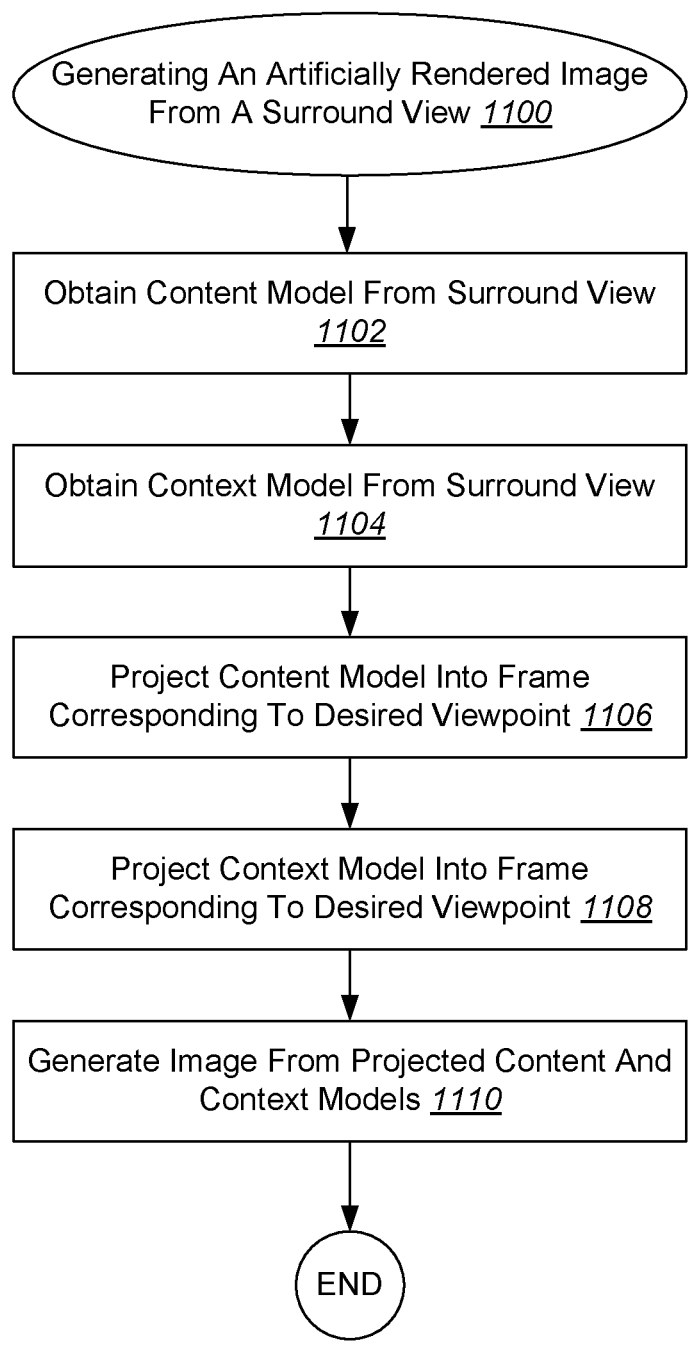
FIG. 11 illustrates an example of a process for generating an artificially rendered image from a surround view.

With reference to FIG. 11, shown is an example of a process 1100 for generating an artificially rendered image from a surround view. As described previously, a surround view is a multi-view interactive digital media representation. In some examples, the surround view is generated from multiple images having location information, and at least a portion of overlapping subject matter. Furthermore, according to various embodiments, the surround view is generated by interpolating between the multiple images and/or extrapolating data from the multiple images. In the present example, a surround view can be decomposed into one or more background panoramic representations and, in some examples, one or more foreground 3D models. An image at a specific viewpoint is then rendered by projecting the 3D model(s) and the panoramic representation(s) into a frame according to the current viewpoint and the depth and orientation of the 3D model(s).

In the present embodiment, a content model is obtained from a surround view at 1102. This content model is a foreground three-dimensional model including at least one object. In some examples, obtaining the content model from the surround view includes extracting the content model from the surround view. At 1104, a context model is obtained from the surround view. This context model is a background panoramic representation including scenery surrounding any objects in the content model. In some examples, obtaining the context model from the surround view includes extracting the context model from the surround view. Next, the content model is projected into a frame corresponding to a desired viewpoint at 1106. The context model is also projected into the frame corresponding to the desired viewpoint at 1108. According to various embodiments, the content model and context model are projected according to the depth and orientation of the content model. The artificially rendered image at the desired viewpoint is generated from a combination of the projected content and context at 1110.

Various examples of viewpoint interpolation and extrapolation are described in the present disclosure. According to various embodiments, one or a combination of methods can be used to generate a single artificially rendered image. For instance, one layer can be handled using the method described with regard to FIG. 3, another layer can be handled using the method described with regard to FIGS. 5A-5B, and a background layer can be handled using the method described with regard to FIG. 8. Any combination of methods can be used within the scope of this disclosure. Additionally, any one method can be used alone to generate an artificially rendered image.

The methods presented in this disclosure are highly efficient and can be run on a mobile platform in real-time. The various methods require only very small amounts of additional data and are therefore extremely well-suited for data that needs to be sent over a wireless network (e.g. LTE). In addition, the methods are sufficiently regularized to handle problematic cases without creating jarring artifacts. Accordingly, the methods described herein are suitable for generating artificially rendered images on mobile devices, etc.

Figure 12:
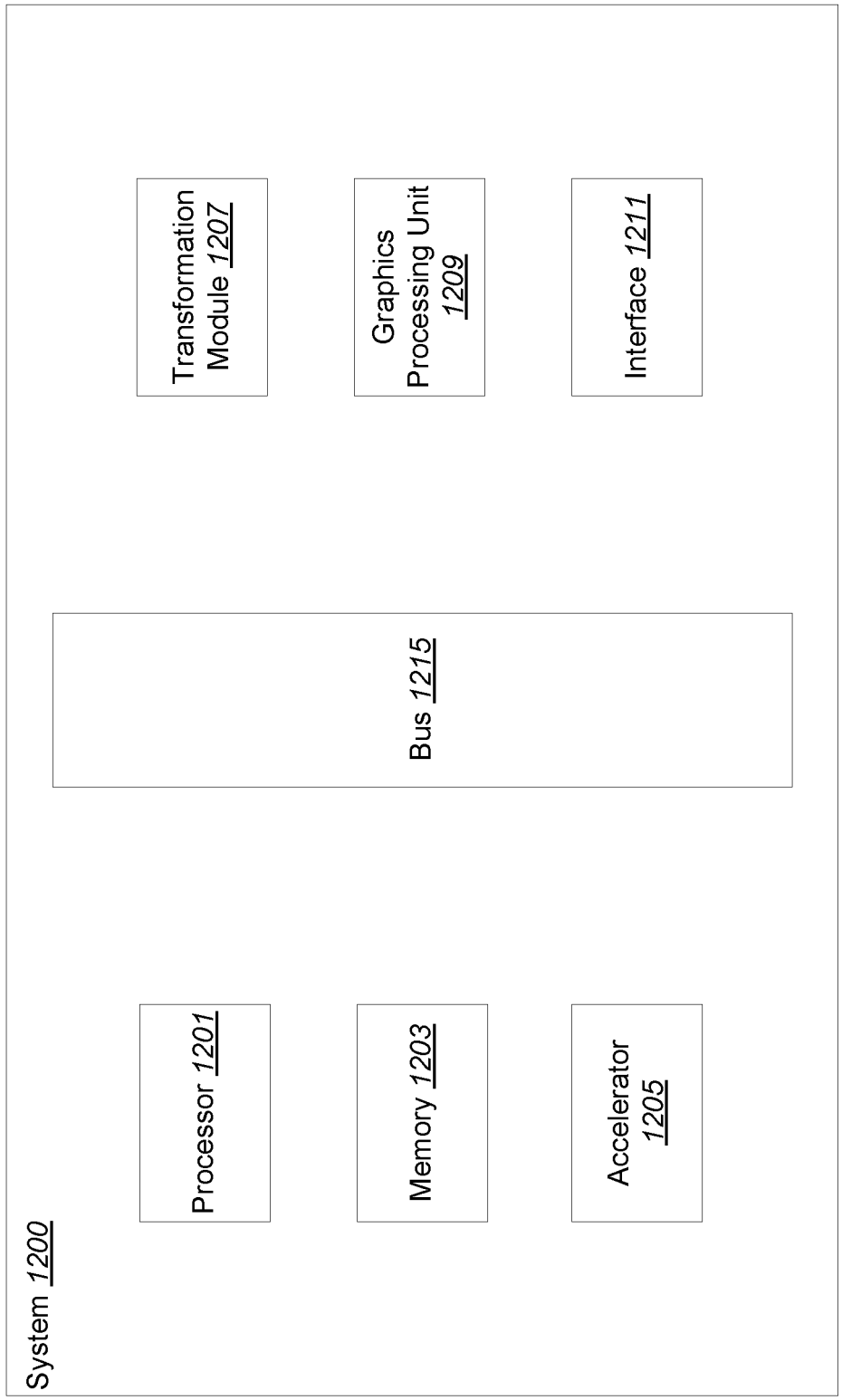
FIG. 12 illustrates a particular example of a computer system that can be used with various embodiments of the present invention.

Various computing devices can implement the methods described. For instance, a mobile device, computer system, etc. can be used to generate artificially rendered images. With reference to FIG. 12, shown is a particular example of a computer system that can be used to implement particular examples of the present invention. For instance, the computer system 1200 can be used to provide generate artificially rendered images according to various embodiments described above. In addition, the computer system 1200 shown can represent a computing system on a mobile device.

According to particular embodiments, a system 1200, suitable for implementing particular embodiments of the present disclosure, includes a processor 1201, a memory 1203, accelerator 1205, image editing module 1209, an interface 1211, and a bus 1215 (e.g., a PCI bus or other interconnection fabric) and operates as a streaming server. In some embodiments, when acting under the control of appropriate software or firmware, the processor 1201 is responsible for various processes, including processing inputs through various computational layers and algorithms. Various specially configured devices can also be used in place of a processor 1201 or in addition to processor 1201. The interface 1211 is typically configured to send and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1200 uses memory 1203 to store data and program instructions for operations including surround view generation, keypoint selection, keypoint tracking, calculating inlier groups, measuring image intensity differences, image rendering, and various image transformation operations. The program instructions may control the operation of an operating system and/or one or more applications, for example. The memory or memories may also be configured to store received metadata and batch requested metadata.

In some embodiments, system 1200 further comprises a graphics processing unit (GPU) 1209. As described above, the GPU 1209 may be implemented to process each pixel on a separate thread to determine the optimal transformation to apply for each pixel, such as in steps 923 and 925, and/or operation 1015. In some embodiments, system 1200 further comprises an accelerator 1205. In various embodiments, accelerator 1205 is a rendering accelerator chip, which may be separate from the graphics processing unit. Accelerator 1205 may be configured to speed up the processing for the overall system 1200 by processing pixels in parallel to prevent overloading of the system 1200. For example, in certain instances, ultra-high-definition images may be processed, which include many pixels, such as DCI 4K or UHD-1 resolution. In such instances, excess pixels may be more than can be processed on a standard GPU processor, such as GPU 1209. In some embodiments, accelerator 1205 may only be utilized when high system loads are anticipated or detected.

In some embodiments, accelerator 1205 may be a hardware accelerator in a separate unit from the CPU, such as processor 1201. Accelerator 1205 may enable automatic parallelization capabilities in order to utilize multiple processors simultaneously in a shared memory multiprocessor machine. The core of accelerator 1205 architecture may be a hybrid design employing fixed-function units where the operations are very well defined and programmable units where flexibility is needed. In various embodiments, accelerator 1205 may be configured to accommodate higher performance and extensions in APIs, particularly OpenGL 2 and DX9. In some embodiments, accelerator 1205 may work in conjunction with transformation module 1207 configured for solving transformations, such as in step 907, determining transformation candidates, such as in steps 909 to 917, and/or applying transformations to individual pixels, such as in steps 923 and 925. In some embodiments, transformation module 1207 may only be utilized when high system loads are anticipated or detected.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method for interpolating images of an object, the method including:
obtaining a sequence of images, the sequence of images including a first image and a second image;
computing, using a predetermined algorithm, a plurality of transformations between the first and second images;
determining an optimal subset of transformations from the plurality of transformations based on predetermined criteria, wherein determining the optimal subset of transformations includes selecting an optimal transformation candidate for each pixel of the first image, wherein selecting an optimal transformation candidate for each pixel is processed as a separate thread such that the processing time for each pixel is bounded by O(1) rather than O(n), wherein the plurality of transformations includes a subset of transformation candidates, wherein determining the optimal subset of transformations includes applying each transformation candidate in the subset of transformation candidates to each pixel in the first image, thereby generating a plurality of first interpolated pixel candidates, and to a corresponding pixel in the second image, thereby generating a plurality of second interpolated pixel candidates, and then comparing the plurality of first interpolated pixel candidates to the corresponding plurality of second interpolated pixel candidates to select an optimal transformation candidate having the smallest corresponding pixel candidate difference; and
calculating transformation parameters corresponding to the optimal subset of transformations.

2. The method of claim 1, further comprising storing the transformation parameters for on-the-fly interpolation.

3. The method of claim 1, wherein computing the plurality of transformations includes identifying a plurality of correspondences between the first and second images.

4. The method of claim 1, wherein transformations are computed for a predetermined number of keypoint correspondences.

5. The method of claim 1, wherein computing a transformation includes using one or more of the following transformations: similarity, homography, image warping, dense optical flow, and sparse optical flow.

6. The method of claim 1, wherein determining the optimal subset of transformations includes, for a particular transformation:
determining a number of inlier keypoints; and
calculating an image intensity difference value between a transformed image and the second image.

7. The method of claim 1, wherein a random sample consensus (RANSAC) algorithm is implemented to compute the plurality of transformations and determine the optimal subset of transformations.

8. The method of claim 1, wherein a transformation in the subset of transformations is selected for each pixel during on-the-fly interpolation.

9. The method of claim 1, further comprising applying the transformation parameters during runtime based on a user selection.

10. The method of claim 9, wherein the user selection corresponds to a projected physical location of a camera along a calculated camera translation.

11. A system for interpolating images of an object, the system comprising:
a processor, and
memory storing one or more programs configured for execution by the processor, the one or more programs comprising instructions for:
obtaining a sequence of images, the sequence of images including a first image and a second image;
computing, using a predetermined algorithm, a plurality of transformations between the first and second images;
determining an optimal subset of transformations from the plurality of transformations based on predetermined criteria, wherein determining the optimal subset of transformations includes selecting an optimal transformation candidate for each pixel of the first image, wherein selecting an optimal transformation candidate for each pixel is processed as a separate thread such that the processing time for each pixel is bounded by O(1) rather than O(n), wherein the plurality of transformations includes a subset of transformation candidates, wherein determining the optimal subset of transformations includes applying each transformation candidate in the subset of transformation candidates to each pixel in the first image, thereby generating a plurality of first interpolated pixel candidates, and to a corresponding pixel in the second image, thereby generating a plurality of second interpolated pixel candidates, and then comparing the plurality of first interpolated pixel candidates to the corresponding plurality of second interpolated pixel candidates to select an optimal transformation candidate having the smallest corresponding pixel candidate difference; and calculating transformation parameters corresponding to the optimal subset of transformations.

12. The system of claim 11, wherein the one or more programs further comprises instructions for storing the transformation parameters for on-the-fly interpolation.

13. The system of claim 11, wherein computing the plurality of transformations includes identifying a plurality of correspondences between the first and second images.

14. The system of claim 11, wherein transformations are computed for a predetermined number of keypoint correspondences.

15. The system of claim 11, wherein computing a transformation includes using one or more of the following transformations: similarity, homography, image warping, dense optical flow, and sparse optical flow.

16. The system of claim 11, wherein determining the optimal subset of transformations includes, for a particular transformation:
determining a number of inlier keypoints; and
calculating an image intensity difference value between a transformed image and the second image.

17. The system of claim 11, wherein a random sample consensus (RANSAC) algorithm is implemented to compute the plurality of transformations and determine the optimal subset of transformations.

18. The system of claim 11, wherein a transformation in the subset of transformations is selected for each pixel during on-the-fly interpolation.

19. The system of claim 11, wherein the one or more programs further comprises instructions for applying the transformation parameters during runtime based on a user selection.

20. A non-transitory computer readable medium storing one or more programs configured for execution by a computer, the one or more programs comprising instructions for:
obtaining a sequence of images, the sequence of images including a first image and a second image;
computing, using a predetermined algorithm, a plurality of transformations between the first and second images;
determining an optimal subset of transformations from the plurality of transformations based on predetermined criteria, wherein determining the optimal subset of transformations includes selecting an optimal transformation candidate for each pixel of the first image, wherein selecting an optimal transformation candidate for each pixel is processed as a separate thread such that the processing time for each pixel is bounded by $O(1)$ rather than $O(n)$, wherein the plurality of transformations includes a subset of transformation candidates, wherein determining the optimal subset of transformations includes applying each transformation candidate in the subset of transformation candidates to each pixel in the first image, thereby generating a plurality of first interpolated pixel candidates, and to a corresponding pixel in the second image, thereby generating a plurality of second interpolated pixel candidates, and then comparing the plurality of first interpolated pixel candidates to the corresponding plurality of second interpolated pixel candidates to select an optimal transformation candidate having the smallest corresponding pixel candidate difference; and
calculating transformation parameters corresponding to the optimal subset of transformations.

* * * * *